United States Patent [19]

Umehara et al.

[11] Patent Number: 4,830,944
[45] Date of Patent: May 16, 1989

[54] FUNCTION SEPARATED PHOTOSENSITIVE MEMBER HAVING A DIPHENYLAMINE DERIVATIVE DISAZO CHARGE GENERATION MATERIAL

[75] Inventors: Shoji Umehara; Masakazu Matsumoto, both of Yokohama; Takao Takiguchi, Tokyo; Shozo Ishikawa, Yokohama, all of Japan

[73] Assignee: Canon Kabushiki Kaisha, Tokyo, Japan

[21] Appl. No.: 943,503

[22] Filed: Dec. 19, 1986

[30] Foreign Application Priority Data

Dec. 20, 1985 [JP] Japan ................. 60-288178

[51] Int. Cl.$^4$ .................. G03G 5/06; G03G 5/14
[52] U.S. Cl. ....................... 430/59; 430/73; 430/76; 430/77; 430/78; 534/809
[58] Field of Search .............. 430/74, 76, 77, 79, 430/59, 73, 78; 534/809

[56] References Cited

U.S. PATENT DOCUMENTS

| | | | |
|---|---|---|---|
| 4,582,771 | 4/1986 | Ohta | 430/79 |
| 4,596,754 | 6/1986 | Tsutsui et al. | 430/58 |
| 4,599,287 | 7/1986 | Fujimaki et al. | 430/79 |
| 4,600,674 | 7/1986 | Emoto et al. | 430/79 |
| 4,702,982 | 10/1987 | Matsumoto et al. | 430/72 |
| 4,743,523 | 5/1988 | Yamashita et al. | 430/59 |

*Primary Examiner*—John L. Goodrow
*Attorney, Agent, or Firm*—Fitzpatrick, Cella, Harper & Scinto

[57] ABSTRACT

A function separated type electrophotographic photosensitive member for infrared rays comprises a combination of a charge generation material and a charge transport material, wherein the electrophotographic photosensitive member for infrared rays contains as the charge generation material a disazo pigment represented by Formula (1).

18 Claims, 1 Drawing Sheet

FUNCTION SEPARATED PHOTOSENSITIVE MEMBER HAVING A DIPHENYLAMINE DERIVATIVE DISAZO CHARGE GENERATION MATERIAL

BACKGROUND OF THE INVENTION

1. Field of the Invention

This invention relates to a function-separated type electrophotographic photosensitive member for infrared rays, which is comprised of a combination of an organic photoconductor serving as a charge generation material, with a charge transport material.

2. Related Background Art

Pigments and dyes exhibiting photoconductivity have been hitherto reported in a great number of publications. For example, RCA review Vol. 23, pp. 413–419 September 1962) reports photoconductivity of phthalocyanine pigments, and U.S. Pat. Nos. 3,397,086 and 3,816,118 disclose electrophotgraphic photosensitive members employing such phthalocyanine pigments. Other organic photoconductive materials used for electrophotographic photosensitive members may include, for example, pyrilium type dyes disclosed in U.S. Pat. Nos. 4,315,983 and 4,327,169 or Research Disclosure 20517 (May, 1981), squaric acid methine dyes disclosed in U.S. Pat. No. 3,824,099, and disazo pigments disclosed in U.S. Pat. Nos. 3,898,084 and 4,251,613.

These organic photoconductive materials can be synthesized more easily as compared with inorganic photoconductive materials. Moreover, the color sensitivity thereof can be controlled since they can be relatively easily changed to have a different photosensitive wavelength region in respect of the sensitivity to visible light by changing molecular arrangement. They are also free from environmental pollution, and have remarkably superior productivity and economical advantages as compared with inorganic photoconductive materials. For these reasons, manufacturers are recently competing with each other to speed development, and there have been available not a few photoconductive materials that have attained practically utilizable levels in respect of sensitivity, durability and so forth.

On the other hand, recent years, there is a rapidly increasing demand that these organic photoconductive materials might be desirably used for photosensitive members for digital recording means such as a laser printer by extending the photosensitive wavelength region up to the infrared wavelength, in particular, the wavelength for a semiconductor laser (at the present state of the art, most preferably 750 mm or more, particularly around 780 to 800 nm from practical viewpoints such as economical advantage, output, matching with photosensitive materials, etc.). Considering the conventional organic photoconductive materials from these points of view, the above-mentioned phthalocyanine pigments, aluminum phthalocyanine pigments disclosed in U.S. Pat. No. 4,426,434 which are improvements of the phthalocyanine pigments, triphenylamine type trisazo pigments disclosed in U.S. Pat. Nos. 4,436,800 and 4,439,506, tetrakisazo pigments disclosed in U.S. Pat. No. 4,447,513, etc. are proposed as organic photoconductive materials for near infrared rays.

However, particularly when the organic photoconductive materials are used as photosensitive members for semiconductor lasers, it is required firstly that they have a photosensitive wavelength region extending up to a long wavelength, secondly that they have good sensitivity and durability, that they have constant sensitivity over a wide wavelength region as the wavelength of the semiconductor may vary depending on temperature when used, and further that they have good productivity. The organic photoconductive materials mentioned above do not suffficiently satisfy these conditions.

As a result of intensive repeated studies, the present inventors have succeeded in providing a novel organic photoconductive material that can perfectly satisfy the above conditions.

SUMMARY OF THE INVENTION

A first object of this invention is to provide a novel organic photoconductive material for infrared rays.

A second object of this invention is to provide an electrophotographic photosensitive member having a high sensitivity at a luminous wavelength region (750 nm or more, particularly 780 to 800 nm) of an infrared light source such as a semiconductor laser, and having flat sensitivity to the wavelength.

A third object of this invention is to provide an electrophotographic photosensitive member showing practical high sensitivity characteristics and stable potential characteristics during repeated use, in a process in which a semiconductor laser is used as a digital recording photosensitive member as in laser copiers, laser beam printers, etc.

A fourth object of this invention is to provide a photoconductive material for infrared rays which is used in devices such as infrared detectors and infrared switching elements.

According to this invention, there is provided a function separated type electrophotographic photosensitive member for infrared rays, comprising a combination of a charge generation material and a charge transport material, wherein the electrophotographic photosensitive member for infrared rays contains as the charge generation material a disazo pigment represented by Formula (1) shown below.

Formula (1):

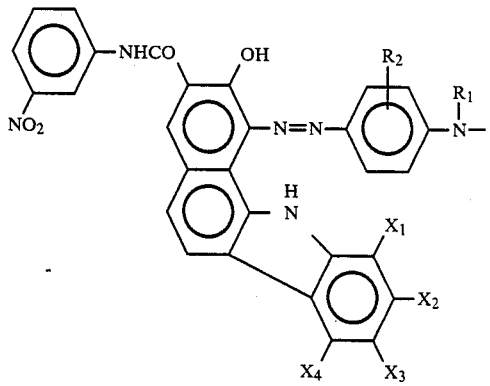

-continued

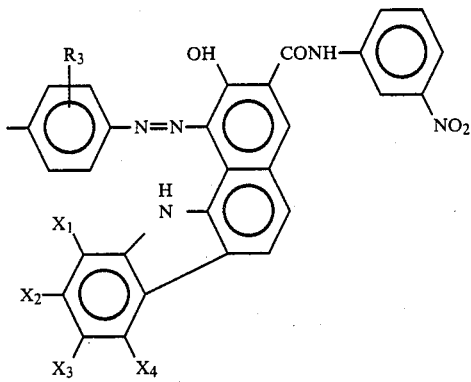

wherein $R_1$ represents a hydrogen atom, a substituted or unsubstituted alkyl group, a substituted or unsubstituted aralkyl group, a substituted or unsubstituted acyl group or a substituted or unsubstituted heterocyclic group; $R_2$ and $R_3$ each represent a hydrogen atom, a substituted or unsubstituted alkyl group, a substituted or unsubstituted alkoxy group, a halogen atom, a nitro group, a cyano group or a trifluoromethyl group; and $X_1$, $X_2$, $X_3$ and $X_4$ each represent a hydrogen atom or a halogen atom, except, however, the case where all of them are hydrogen atoms.

BRIEF DESCRIPTION OF THE DRAWING

Accompanying drawing (FIG. 1) is a view showing an evaluation standard for a photosensitive wavelength region in the photosensitive member of this invention.

DETAILED DESCRIPTION OF THE PREFERRED EMBODIMENTS

Figure 1:
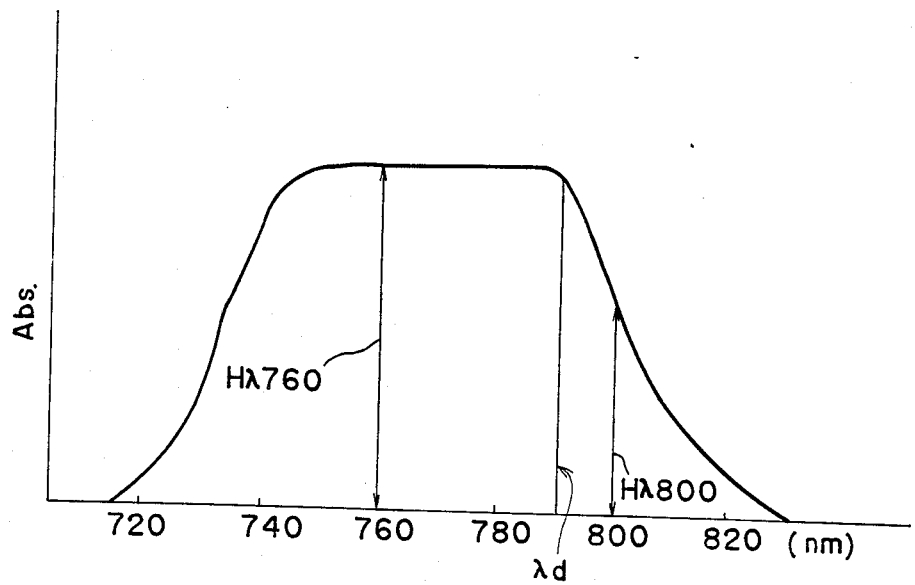

This invention will be described below in detail.

The charge generation material used in this invention is a disazo pigment represented by Formula (1) shown below.

Formula (1):

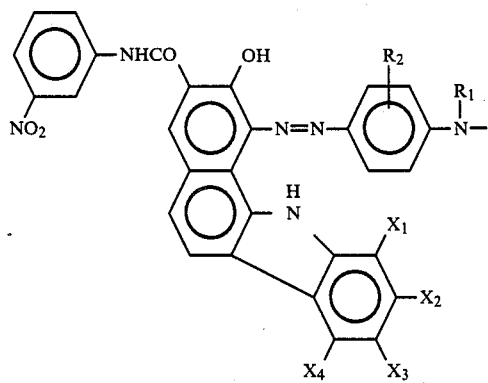

-continued

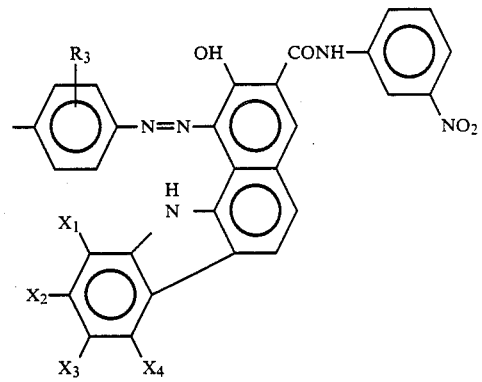

In the formula, $R_1$ represents a hydrogen atom or an alkyl group such as a methyl group, an ethyl group, a propyl group, a butyl group and the like; an aralkyl group such as a benzyl group, a phenethyl group and a naphthylmethyl group and the like; a heterocyclic group such as a pyridyl group, a furyl group, a thienyl group, an indolyl group, a pyrrolyl group, a quinolyl group and the like; or an acyl group such as an acetyl group, a propionyl group, a benzoyl group and the like. The above alkyl group, aralkyl group, heterocyclic group and acyl group may have a substituent, and the substitutent for these may include a hydroxyl group; a halogen atom such as a fluorine atom, a chlorine atom, a bromine atom and an iodine atom; an alkyl group such as a methyl group, an ethyl group, a propyl group, a butyl group and the like; an alkoxy group such as a methoxy group, an ethoxy group, a propoxy group, a butoxy group and the like; a substituted amino group such as a dimethylamino group, a diethylamino group, a dibenzylamino group, a pyrrolidine group, a piperidino group, a morpholino group and the like; a nitro group; a cyano group; and an acyl group such as an acetyl group, a benzoyl group and the like.

In the formula, $R_2$ and $R_3$ each represent a hydrogen atom; an alkyl group such as a methyl group, an ethyl group, a propyl group, a butyl group and the like; a halogen atom such as a fluorine atom, a chlorine atom, a bromine atom and iodine atom; a nitro group; a cyano group; a trifluoromethyl group; or an alkoxy group such as a methoxy group, an ethoxy group, a propoxy group and the like. The above alkyl group or alkoxy group may have a substituent, and the substituent for these may include the substituents set forth in the above.

In the formula, $X_1$, $X_2$, $X_3$ and $X_4$ each represent a hydrogen atom or a halogen atom such as fluorine atom, a chlorine atom, a bromine atom and an iodine atom, except, however, the case where all of them are hydrogen atoms.

Any of the organic photoconductive materials containing the charge generation material of the structure defined above has a practical photosensitive wavelength region of 790 nm or more and has good potential characteristics and durability, but can be most effective when the charge generation material is one represented by Formula (2):

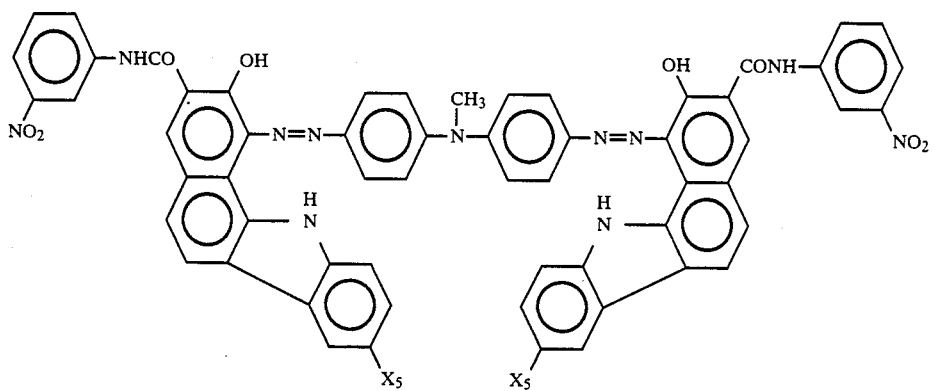

wherein $X_5$ represents a halogen atom including a fluorine atom, a chlorine atom, a bromine atom or an iodine atom.

The disazo compound according to this invention comprises a diphenylamine derivative as a central skeleton to be strongly donative, and has nitro and a halogen in the structure at the both coupler portions to be strongly acceptive, and therefore can readily take the so-called DAD type intramolecular CT structure of "acceptor: donor: acceptor". Thus, the photosensitive region can presumably be shifted to the long wavelength side.

The objects of this invention can be achieved by using in a photosensitive layer the disazo pigment represented by the above Formula (1) or (2). Particularly when it is used in combination with any of charge transport materials represented by Formulas (3) to (8) described herein later, the invention can exhibit remarkable effects.

Typical examples of the disazo pigments represented by Formulas (1) and (2) are shown below by using Formula (9) and a substituent list with respect to Compound Nos. 1 to 49, and using respective structural formulas with respect to Compound Nos. 50 to 89.

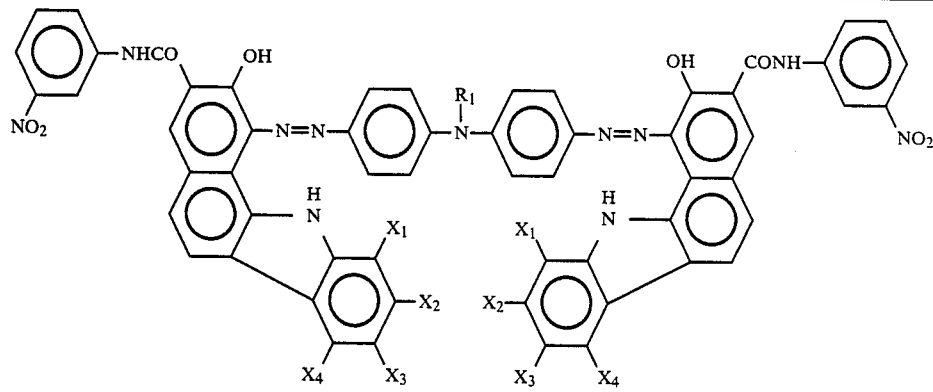

| Compound No. | $R_1$ | $X_1$ | $X_2$ | $X_3$ | $X_4$ |
|---|---|---|---|---|---|
| 1 | —H | —F | —H | —H | —H |
| 2 | —H | —H | —H | —F | —H |
| 3 | —H | —H | —H | —H | —F |
| 4 | —H | —Cl | —H | —H | —H |
| 5 | —H | —H | —H | —Cl | —H |
| 6 | —H | —H | —H | —H | —Cl |
| 7 | —H | —H | —H | —I | —H |
| 8 | —H | —Br | —H | —H | —H |
| 9 | —H | —H | —H | —Br | —H |
| 10 | —H | —H | —H | —H | —Br |
| 11 | —H | —Cl | —H | —Cl | —H |
| 12 | —H | —H | —Cl | —H | —Cl |
| 13 | —CH$_3$ | —F | —H | —H | —H |
| 14 | —CH$_3$ | —H | —F | —H | —H |
| 15 | —CH$_3$ | —H | —H | —F | —H |
| 16 | —CH$_3$ | —H | —H | —H | —F |
| 17 | —CH$_3$ | —Cl | —H | —H | —H |
| 18 | —CH$_3$ | —H | —Cl | —H | —H |
| 19 | —CH$_3$ | —H | —H | —Cl | —H |
| 20 | —CH$_3$ | —H | —H | —H | —Cl |
| 21 | —CH$_3$ | —Br | —H | —H | —H |
| 22 | —CH$_3$ | —H | —H | —Br | —H |
| 23 | —CH$_3$ | —H | —H | —H | —Br |
| 24 | —CH$_3$ | —I | —H | —H | —H |

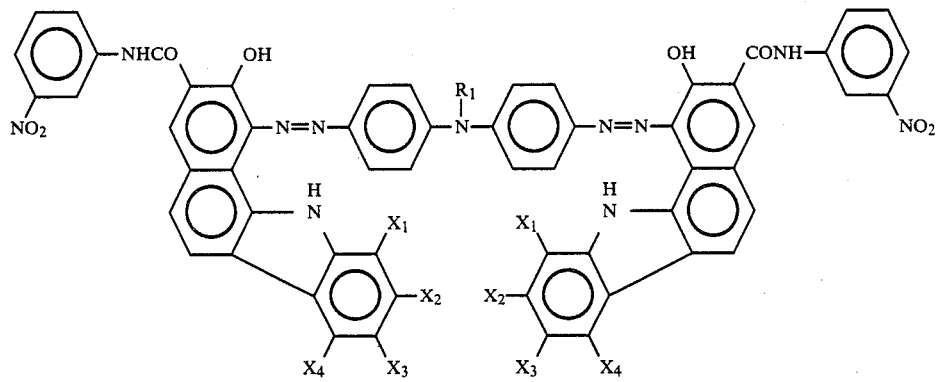
| Compound No. | $R_1$ | $X_1$ | $X_2$ | $X_3$ | $X_4$ |
|---|---|---|---|---|---|
| 25 | —$CH_3$ | —H | —H | —I | —H |
| 26 | —$CH_3$ | —H | —H | —H | —I |
| 27 | —$CH_3$ | —Cl | —H | —Cl | —H |
| 28 | —$CH_3$ | —H | —Cl | —H | —Cl |
| 29 | —$CH_3$ | —Cl | —Cl | —H | —H |
| 30 | —$CH_3$ | —Cl | —H | —H | —Cl |
| 31 | —$CH_3$ | —H | —H | —Cl | —Cl |
| 32 | —$C_2H_5$ | —Cl | —H | —H | —H |
| 33 | —$C_2H_5$ | —H | —H | —Cl | —H |
| 34 | —$C_2H_5$ | —H | —H | —H | —Cl |
| 35 | —$C_2H_5$ | —F | —H | —H | —H |
| 36 | —$C_2H_5$ | —H | —H | —F | —H |
| 37 | —$C_2H_5$ | —H | —H | —H | —F |
| 38 | —$C_2H_5$ | —H | —H | —Br | —H |
| 39 | —$C_2H_5$ | —H | —H | —I | —H |
| 40 | —$C_3H_7$ | —F | —H | —H | —H |
| 41 | —$C_3H_7$ | —H | —H | —F | —H |
| 42 | —$C_3H_7$ | —Cl | —H | —H | —H |
| 43 | —$C_3H_7$ | —H | —H | —Cl | —H |
| 44 | —$C_3H_7$ | —Br | —H | —H | —H |
| 45 | —$C_3H_7$ | —H | —H | —Br | —H |
| 46 | —$C_3H_7$ | —H | —H | —I | —H |
| 47 | —C(=O)—$CH_3$ | —F | —H | —H | —H |
| 48 | 2-pyridyl | —H | —H | —F | —H |
| 49 | 2-pyridyl | —H | —H | —Cl | —H |
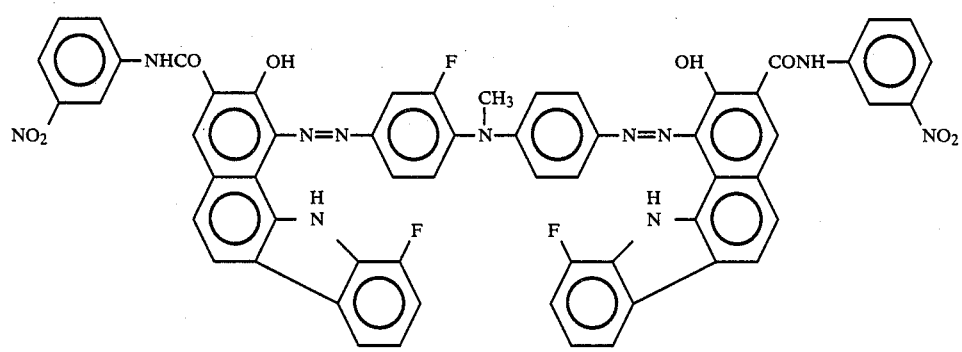
50

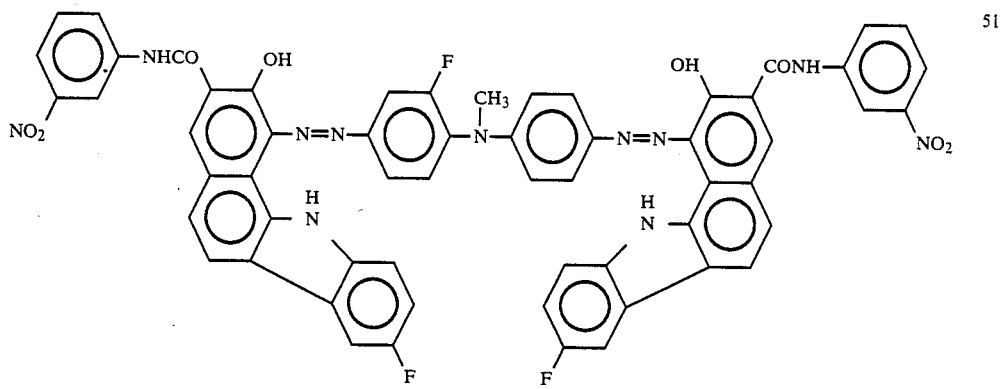
51
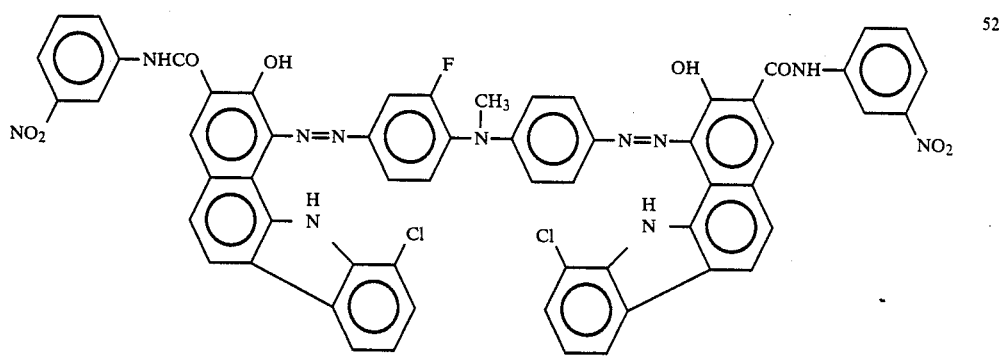
52
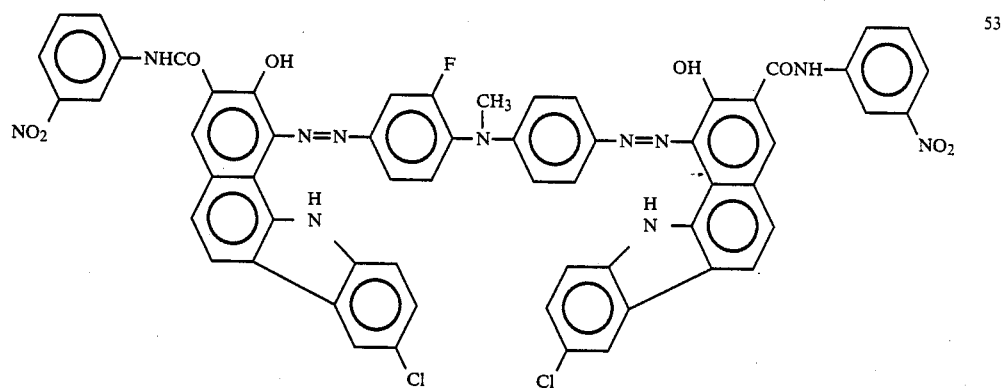
53
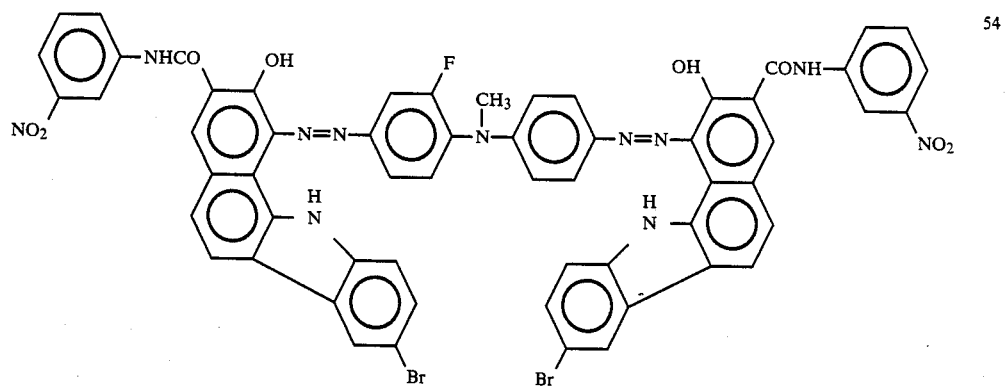
54

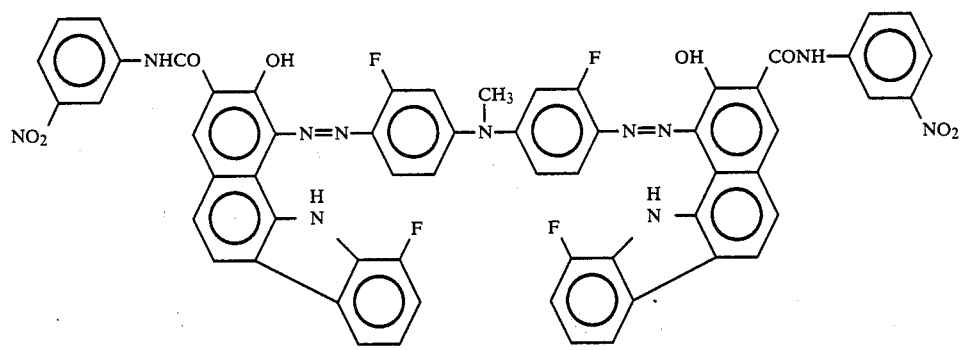
55
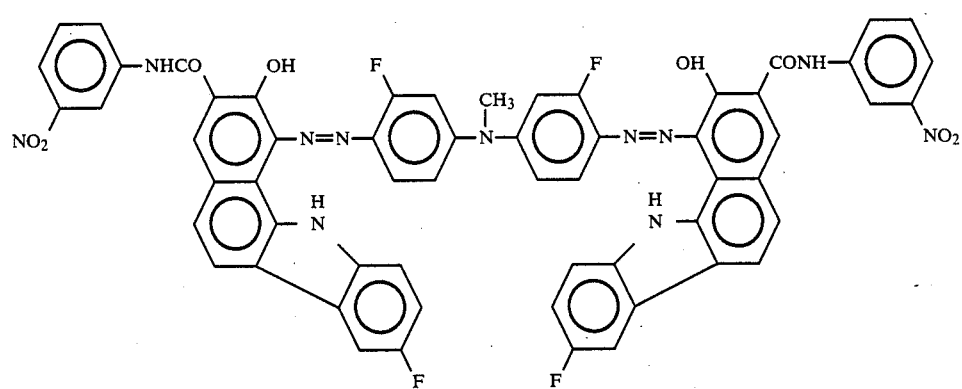
56
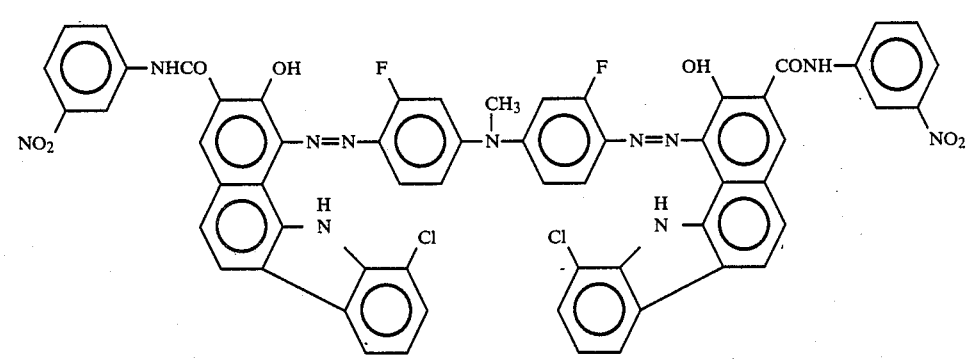
57
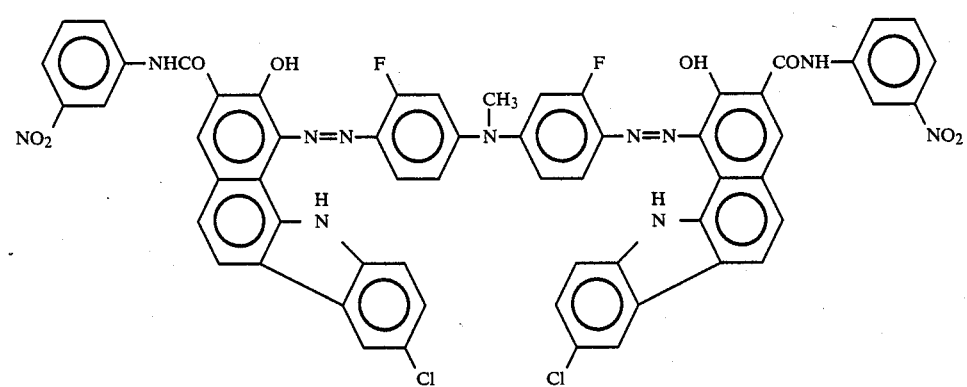
58

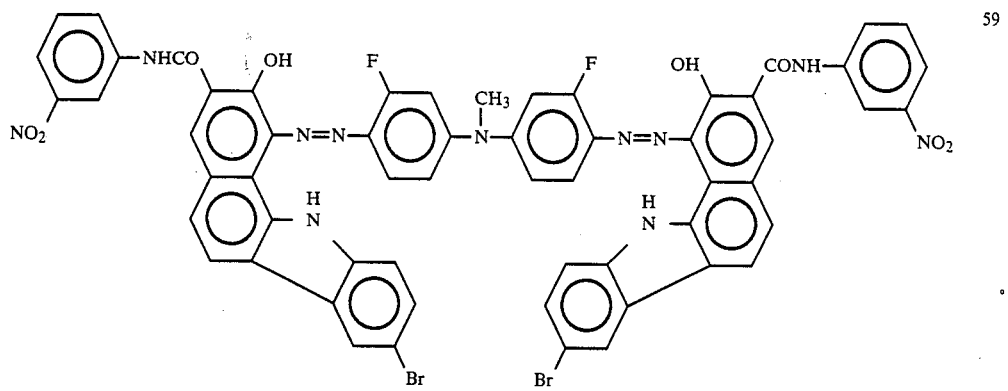
59
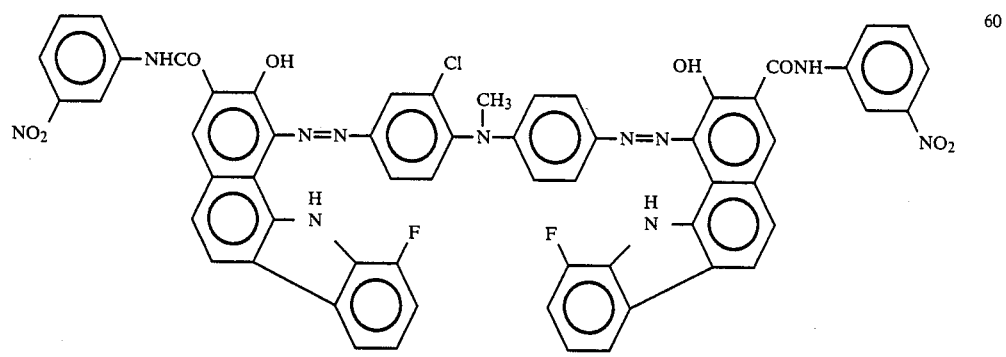
60
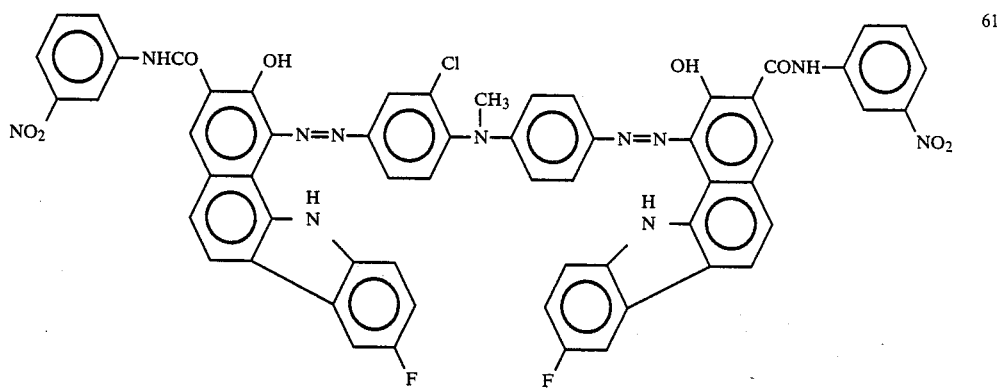
61
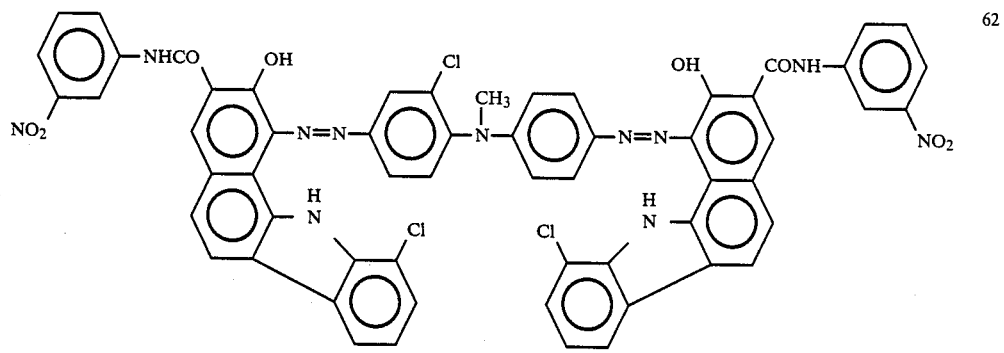
62

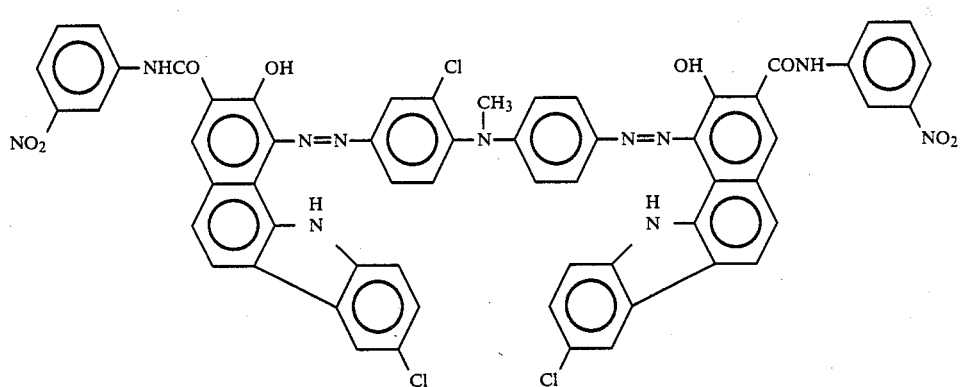
63
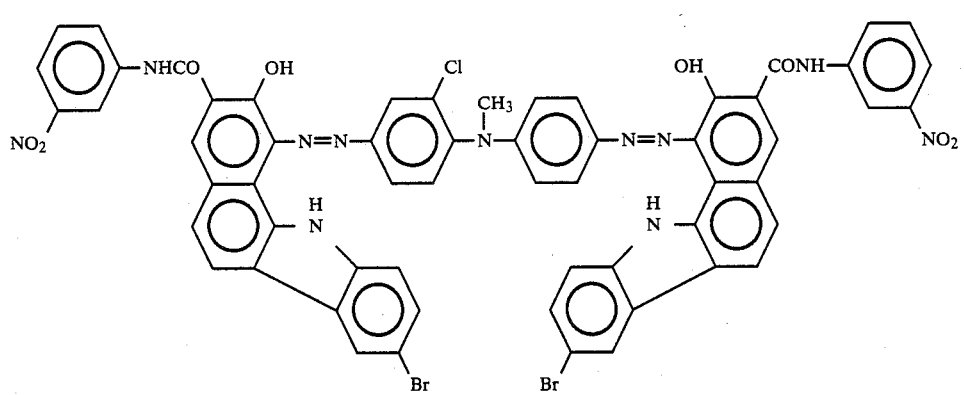
64
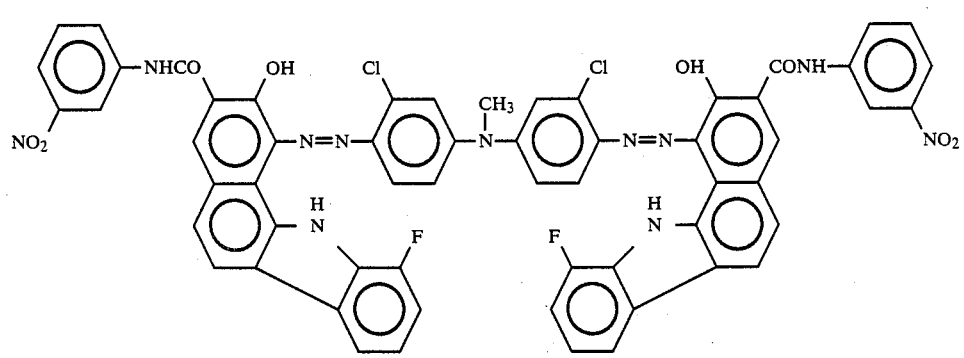
65
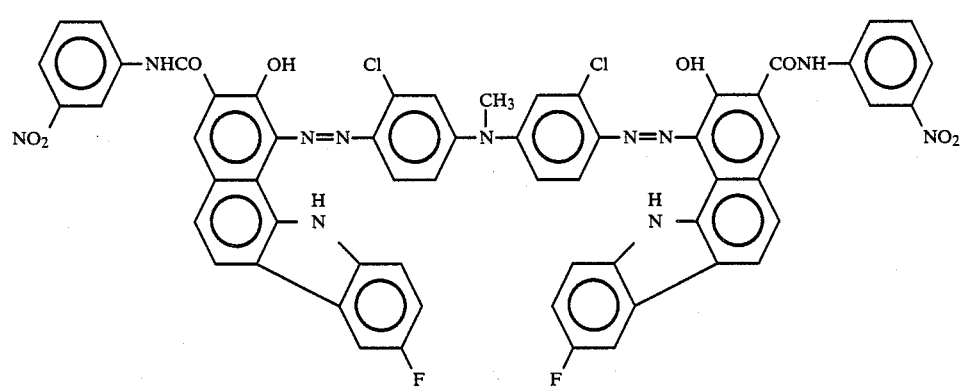
66

-continued
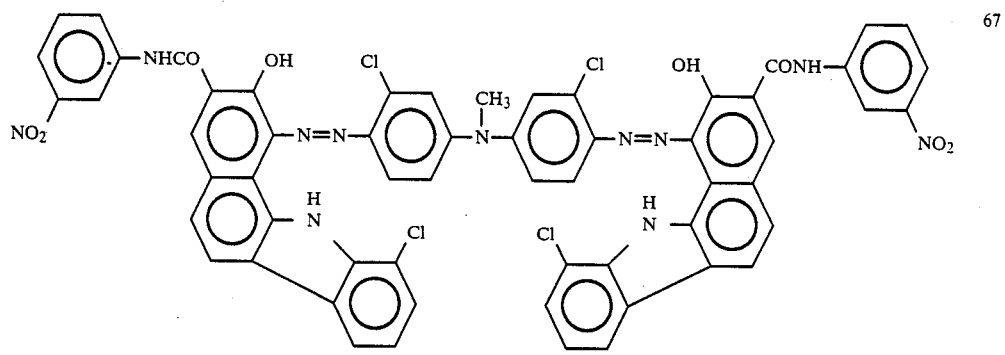
67
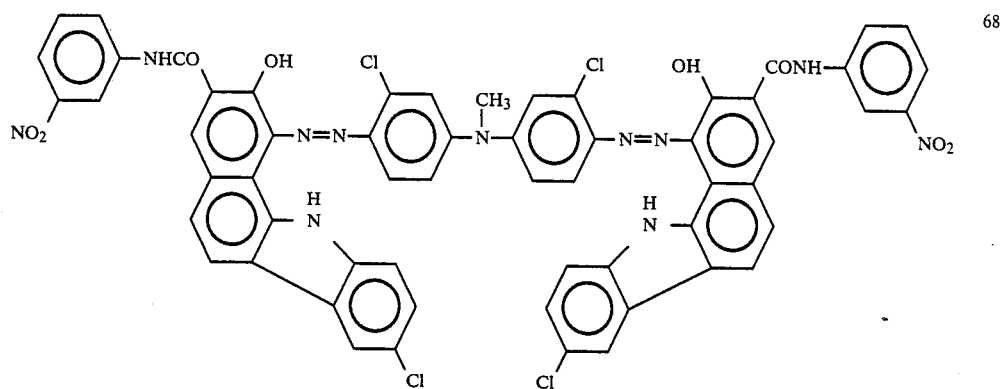
68
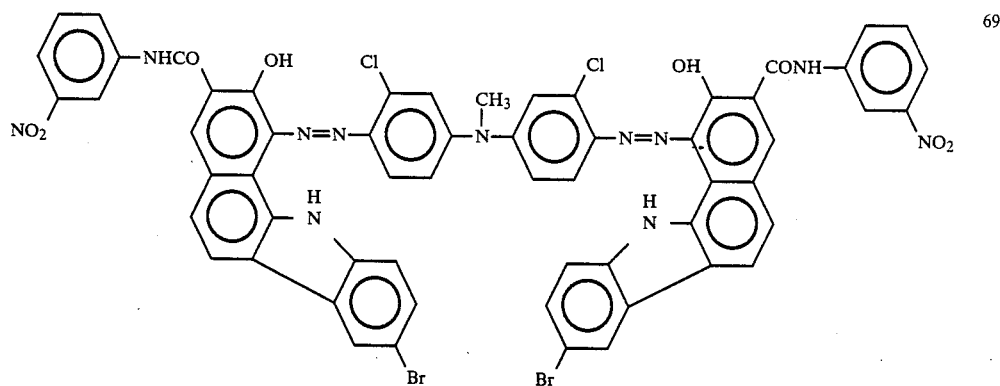
69
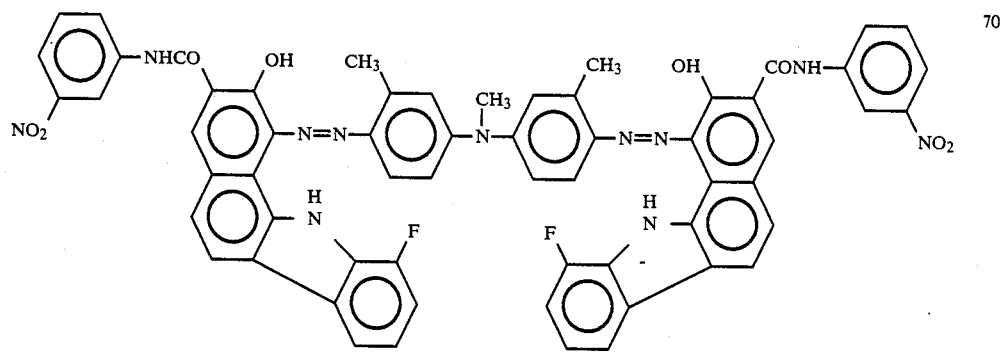
70

-continued
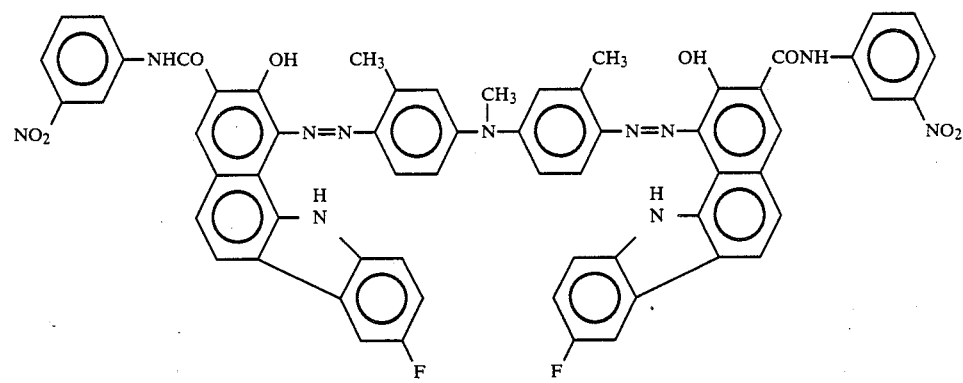
71
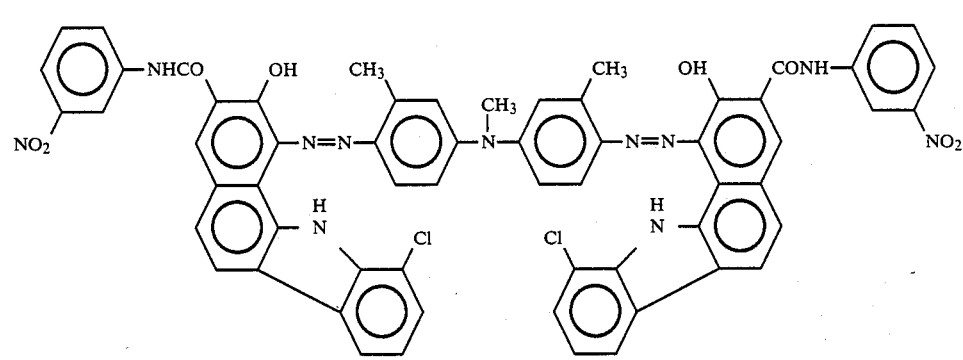
72
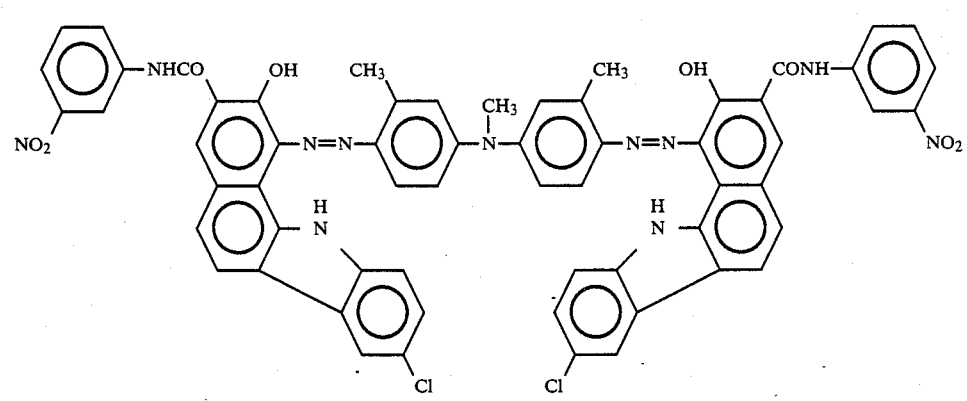
73
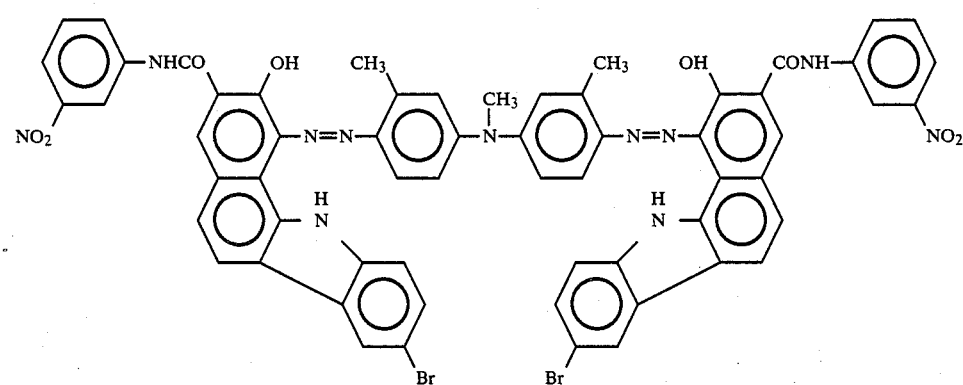
74

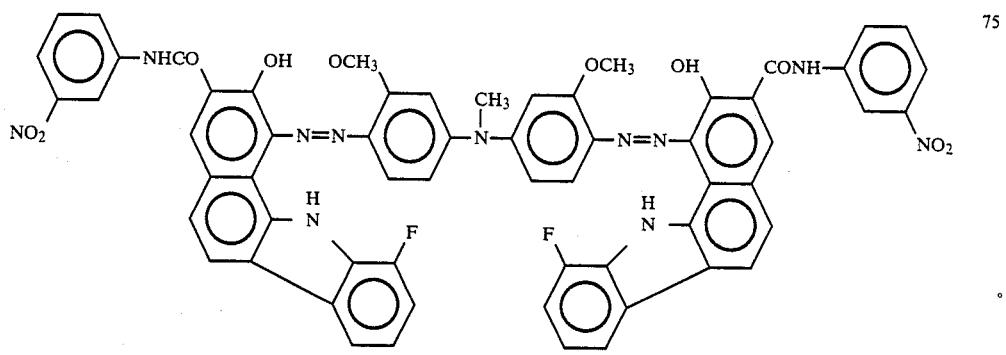
75
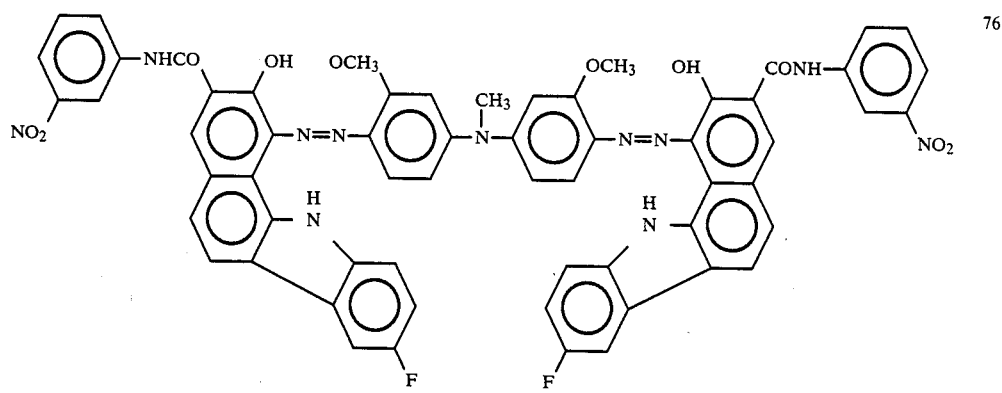
76
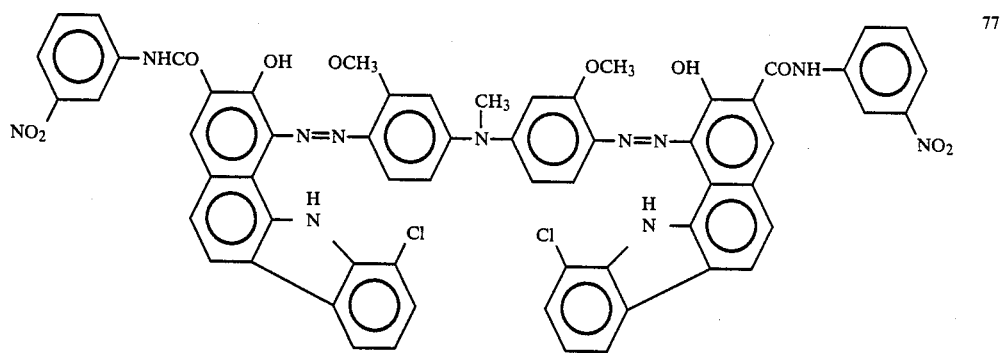
77
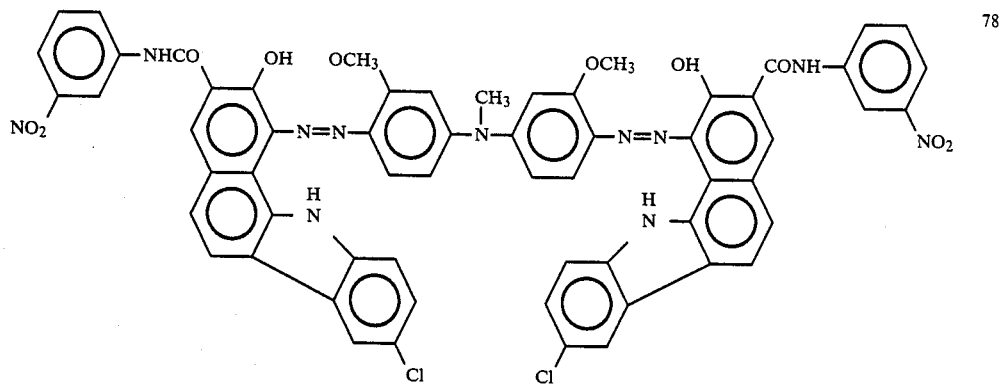
78

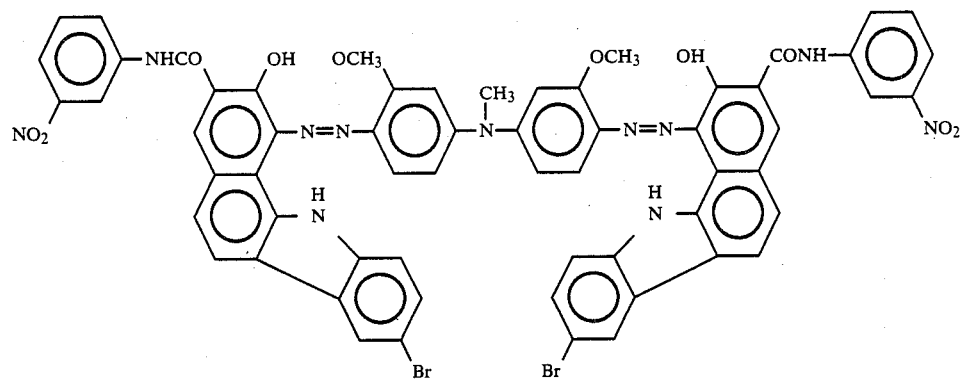
79
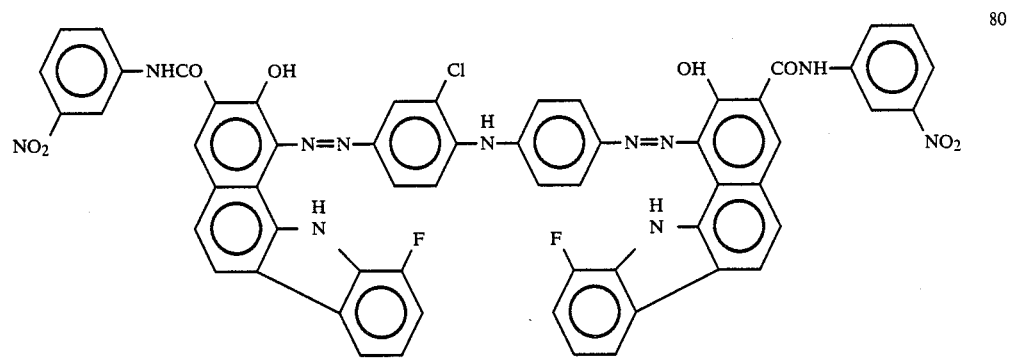
80
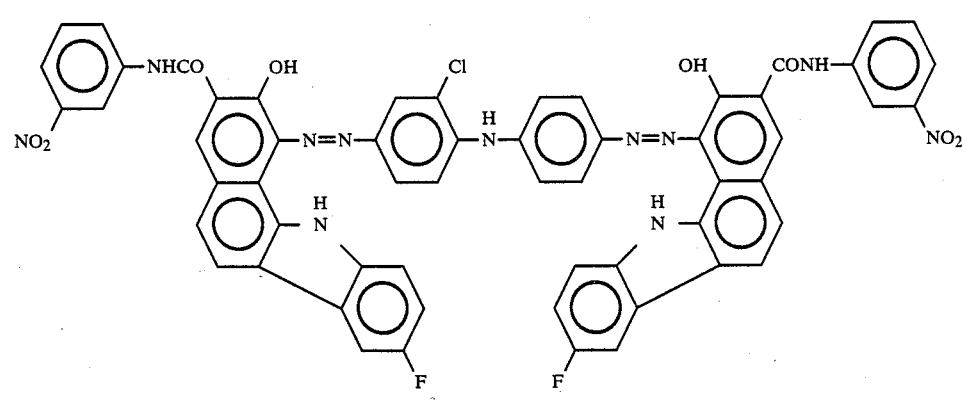
81
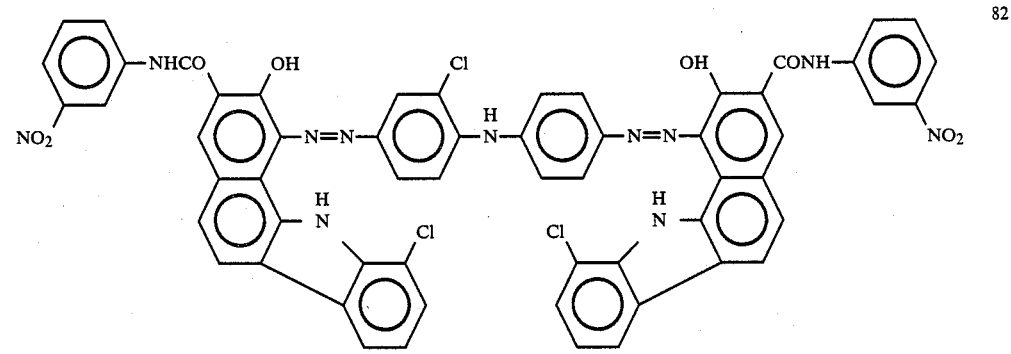
82

-continued
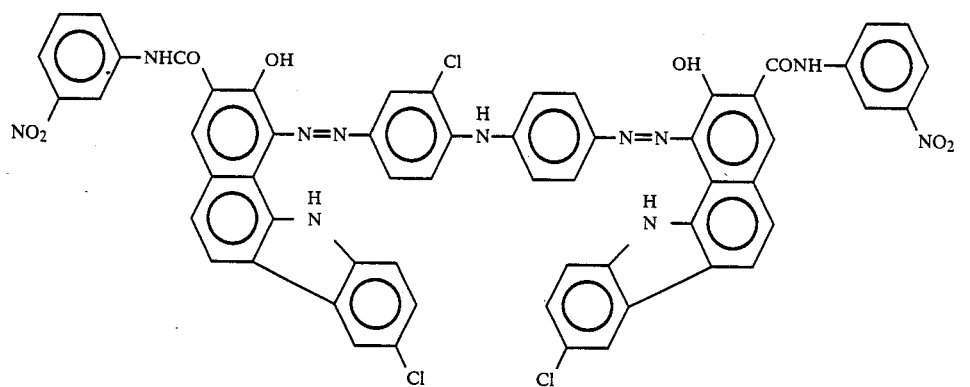
83
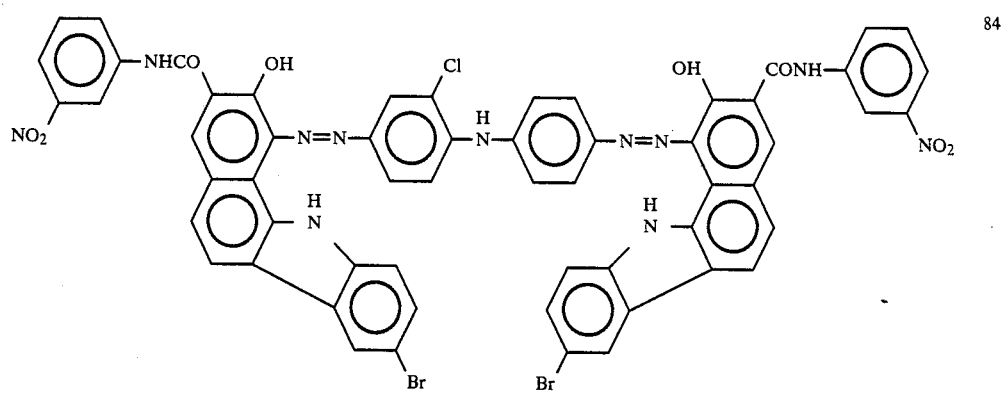
84
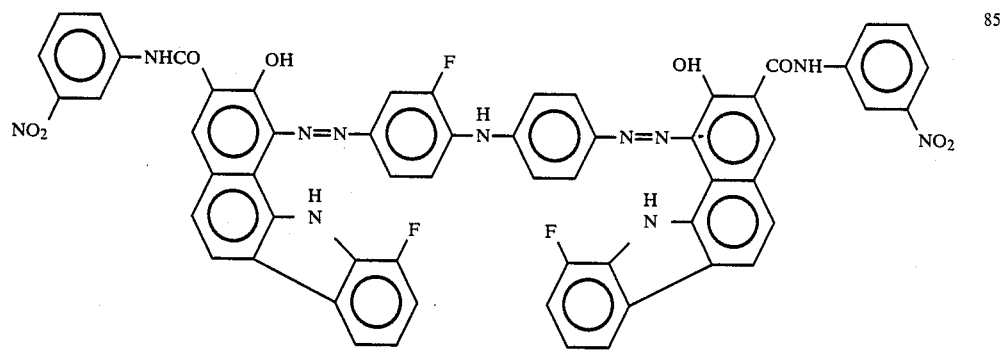
85
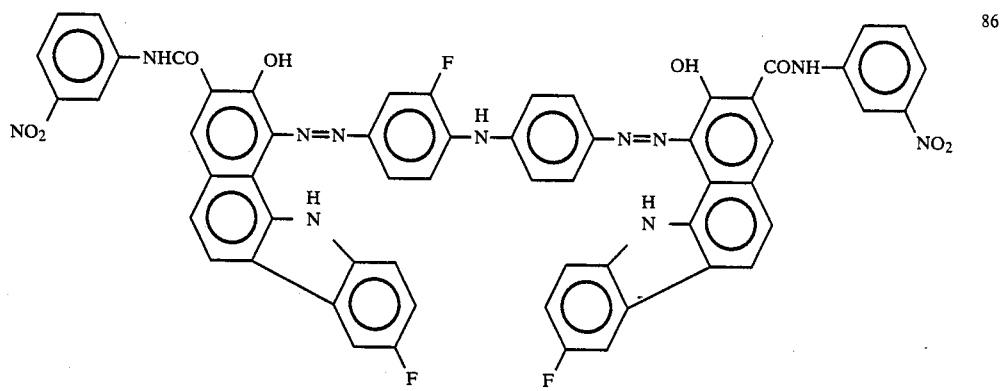
86

-continued

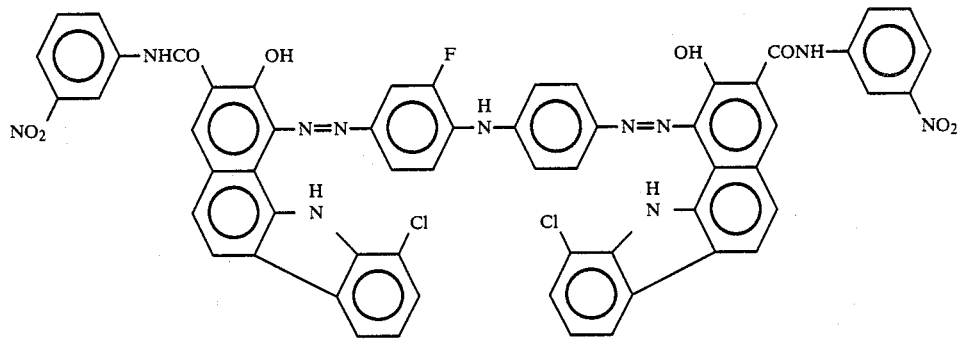
87

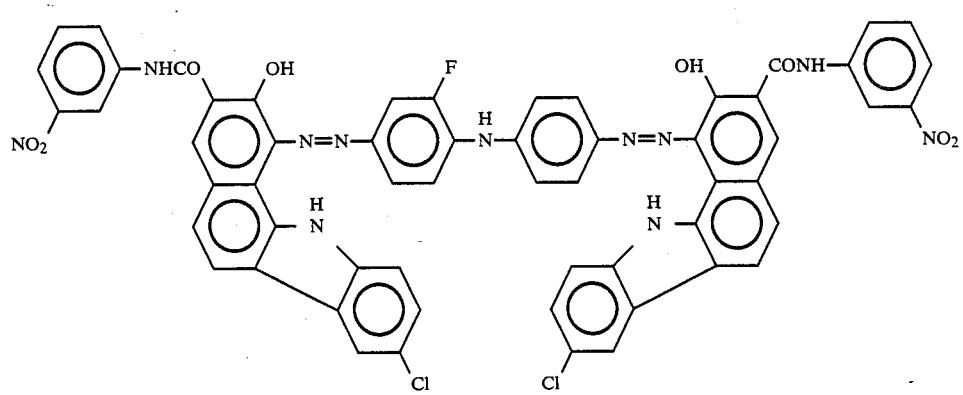
88

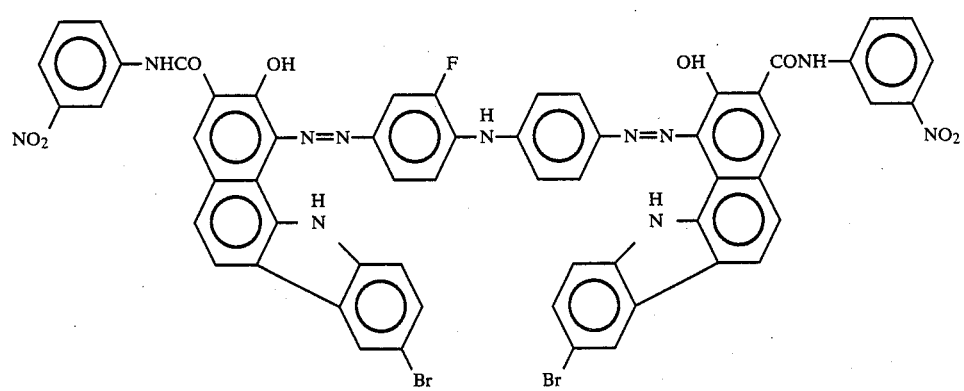
89

The disazo pigments represented by Formula (1) or (2) can be used alone or in combination of two or more compounds.

These pigments used in this invention can be readily produced by, for example;

forming a diamine represented by Formula (1-2):

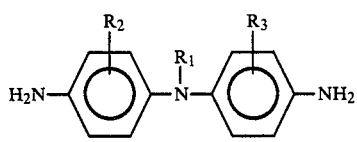
(1-2)

wherein $R_1$, $R_2$ and $R_3$ have the same meaning as defined in Formula (1) into a tetrazo compound according to a conventional method, and then:

coupling in an aqueous system the corresponding couplers in the presence of an alkali, or, after once isolating a tetrazonium salt of the above diamine in the form of a borofluoride or a zinc chloride double salt, coupling the couplers in the presence of an alkali and in a suitable solvent, for example, N,N-dimethylformamide, dimethylsulfoxide, etc.

The couplers can be produced according to a conventional method. For example, as disclosed in Yutaka Hosoda, "Theoretical Production Dye Chemistry", p. 646, the desired couplers can be readily produced by a method comprising:

allowing 2,8-dihydroxynaphthalene-3-carboxylic acid having been treated in an aqueous system by use of sodium sulfite and sodium hydrogesulfite to react under heating, with a hydrazine compound represented by Formula (1-3):

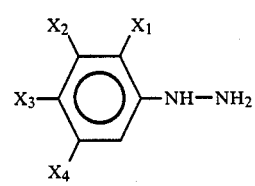
(1-3)

wherein $X_1$, $X_2$, $X_3$ and $X_4$ have the same meaning as defined in Formula (1), in a sulfuric acid acidic atmosphere to give a compound represented by Formula (1-4):

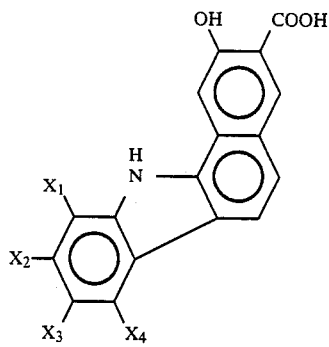

wherein $X_1$, $X_2$, $X_3$ and $X_4$ have the same meaning as defined in Formula (1); followed by condensation with m-nitroaniline and $PCl_3$ in chlorobenzene.

A typical synthesis example for the diazo pigments used in this invention is shown below.

Synthesis Exaample 1

(Synthesis of the above exemplary compound No. 19).

In a 500 ml beaker, 80 ml of water, 49.7 ml (0.563 mole) of conc. hydrochloric acid and 10 g (0.047 mole) of a diamine shown below:

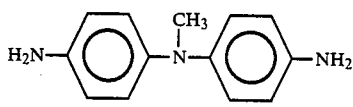

were poured, and, while stirring in a ice bath, the content was made to have a liquid temperature of 3° C. Subsequently, an aqueous solution obtained by dissolving 6.93 g (0.0986 mole) of sodium nitrite in 20 ml of water was dropwise added over a period of 20 minutes while controlling the liquid temperature to the range between 3° C. and 10° C. After completion of the addition, the mixture was further stirred for 30 minutes at the same temperature. Carbon was added to the reaction mixture, followed by filtration to obtain a tetrazo solution.

Next, to the tetrazo solution, an aqueous solution obtained by dissolving 20.5 g (0.187 mole) of sodium borofluoride in 40 ml of water was added to collect by filtration the precipitated tetrazonium borofluoride.

On the other hand, 2 lit. of N,N-dimethylformamide were poured in a 5 lit. breaker, and 33.1 g (0.9767 mole) of a coupler shown below:

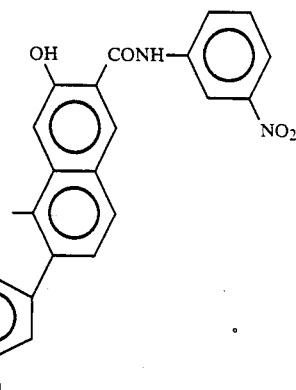

were dissolved therein, and thereafter, while keeping the liquid temperature at 5° to 10° C., 15 g (dry base; 0.0365 mole) of the above tetrazonium borofluoride were added to and dissolved in the solution, followed by dropwise addition of 7.76 g (0.0767 mole) of triethylamine.

After the reaction was completed, the reaction mixture was filtered, and the resulting crude pigment was subjected to dispersion, washing and filtration with use of 2 lit. of N,N-dimethylformamide, which were repeated four times, and thereafter, further repeating washing with water and filtration three times, the filtrate was dried under reduced pressure to obtain 36.9 g of a purified pigment. Yield was found to be 92.0%.

Elemental analysis:

|   | Calculated value (%) | Experimental value (%) |
|---|---|---|
| C | 64.48 | 64.90 |
| H | 3.40 | 3.32 |
| N | 14.02 | 13.98 |

In the foregoing, a synthesis method for a typical pigment has been described, but the disazo pigments represented by Formula (1) or (2) can be also synthesized in the like manner.

A coating comprising the disazo pigment mentioned above can exhibit photoconductivity, and therefore can be used in a photosensitive layer of an electrophotographic photosensitive member using a semiconductor laser as a light source or a photosensitive member for laser beam printers, mentioned below.

Namely, according to an embodiment of this invention, the photosensitive member can be prepared by incorporating by dispersion the above disazo pigment into a suitable binder to form a coating on a conductive support.

In a preferred embodiment of this invention, the above photoconductive coating can be applied as a charge generation layer in a photosensitive member formed by functionally separating the photosensitive layer of an electrophotographic photosensitive member using a semiconductor laser as a light source or a photosensitive member for laser beam printers, into a charge generation layer and a charge transport layer.

The charge generation layer preferably contains the above photoconductive compound as much as possible in order to obtain sufficient absorbance, and also preferably comprises a thin film layer, for example, a thin film layer having a film thickness of 5 μm or less, preferably 0.01 to 1 μm, in order for the generated charge carriers to be effectively transported to an interface at the charge transport layer or an interface at the conductive substrate. This is because most part of the amount of incident light is absorbed at the charge generation layer to generate a number of charge carriers, and because it is necessary to implant the generated charge carries in the charge transport layer without any deactivation due to recombination or trapping.

The charge generation layer can be formed by dispersing the above compound in a suitable binder, and applying the dispersion onto the substrate. The binder used when the charge generation layer is formed by coating can be selected from a wide variety of resins having insulating properties, and also can be selected from organic photoconductive polymers such as poly-N-vinyl carbazole, polyvinyl anthracene and polyvinyl pyrene. Preferably, it may include resins having insulating properties such as polyvinyl butyral, polyarylates (e.g., a condensation polymer of bisphenol A with phthalic acid), polycarbonates, polyesters, phenoxy resins, polyvinyl acetate, acrylic resins, polyacrylamide resins, polyamides, polyvinyl pyridine, cellulose type resins, urethane resins, epoxy resins, casein, polyvinyl alcohol and polyvinyl pyrrolidone. The resin contained in the charge generation layer is suitably in an amount of 80% by weight or less, preferably 40% by weight or less.

Solvent for dissolving these resins may vary depending on the kind of the resins, and is preferably selected from solvents that may not dissolve the charge transport layer and the subbing layer described below. Specifically, as the organic solvent, there may be used alcohols such a methanol, ethanol, isopropanol and the like; ketones such as acetone, methyl ethyl ketone, cyclohexane and the like; amides such as N,N-dimethylformamide, N,N-dimethylacetamide and the like; sulfoxides such as dimethyl sulfoxide and the like; ethers such as tetrahydrofuran, dioxane, ethylene glycol monomethyl ether and the like; esters such as methyl acetate, ethyl acetate and the like; aliphatic halogenated hydrocarbons such as chloroform, methylene chloride, dichloroethylene, carbon tetrachloride, trichloroethylene and the like; aromatics such as benzene, toluene, xylene, monochlorobenzene, dichlorobenzene and the like.

Coating can be carried out by using coating methods such as dip coating, spray coating, spinner coating, bead coating, Meyer bar coating, blade coating, roller coating and curtain coating. Drying is preferably carried out by set to touch drying at room temperature, followed by heat drying. The heat drying can be carried out at a temperature of 30° C. to 200° C. for a period ranging between 5 minutes and 2 hours in a stationary state or under ventilation.

In any photosensitive members, at least one pigment selected from the disazo pigments represented by Formula (1) or (2) is contained, and it may have a crystal form that can be either amorphous or crystalline.

The charge transport material to be used in combination with the charge generation material represented by the above Formula (1) or (2) may particularly effectively include hydrazone compounds represented by Formulas (3) and (4) shown below, an aryl substituted ethylene compounds represented by Formula (5), a pyrazoline compound represented by Formula (6), a diphenyl compound represented by Formula (7), and a terphenyl compound represented by Formula (8).

The hydrazone compound represented by Formula (3) is as follows:

Formula (3):

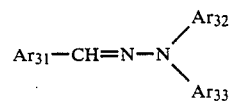

In the formula, $Ar_{31}$ represents an aryl group such as a phenyl group, a diphenyl group, a naphthyl group and an anthryl group, or a monovalent heterocyclic group derived from pyridine, quinoline carbozole, phenothiazine or phynoxazine.

The above aryl gorup and heterocyclic group may have a substituent, and the substituent for these may includes a di-substituted amino group such as a dimethylamino group, a diethyl amino group, a dipropylamino group, a dibutylamino group, a dibenzylamino group, a diphenylamino group, a ditolylamino group, a dixylylamino group, an N,N-methyl-ethylamino group, an N,N-methylphenylamino group an N,N-ethylphenylamino group, an N,N-methyl-benzylamino group, an N,N-ethyl-benzylamino group, an N,N-phenylbenzylamino group and an N,N-phenyltolylamino group; a cyclic amino group such as a morpholino group, a pyrrolidino group and a piperidino group; an alkoxy group such as a methoxy group, an ethoxy group, a propoxy group and a butoxy group; an alkyl group such as a methyl group, an ethyl group, a propyl group, a butyl group and amyl group; a halogen atom such as a fluorine atom, a chlorine atom, a bromine atom and an iodine atom; etc.

In the formula $Ar_{32}$ and $Ar_{33}$ each represent an alkyl group such as a methyl group, an ethyl group and a propyl group; an aryl group such as a phenyl group, a diphenyl group, an α-naphthyl group and a β-naphthyl group; or an aralkyl group such as a benzyl group, a phenetyl group, a chlorobenzyl group, a dichlorobenzyl group, a methoxybenzyl group, an α-naphthylmethyl group and a β-naphthylmethyl group.

The above aryl group and aralkyl group may have a substituent, and the substituent for these may include an alkyl group such as a methyl group, an ethyl group, a propyl group, a butyl group and an amyl group; a halogen atom such as a fluorine atom, a chlorine atom, a bromine atom and an iodine atom; an alkoxy group such as a methoxy group, an ethoxy group and a propoxy group; a cyano group, a nitro group, a trifluoromethyl group, etc.

There are obtained remarkable effects when, among the above hydrazone compounds having the structure of Formula (3), particularly the compound of Formula (4) shown below is combined with the disazo pigment of Formula (2).

Formula (4):

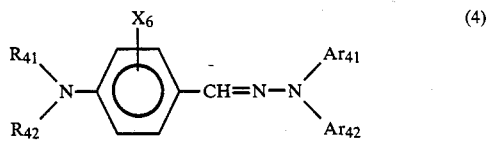

In the formula, $R_{41}$ and $R_{42}$ each represent an alkyl group such as a methyl group, an ethyl group, a propyl group, a butyl group and an amyl group; an aryl group such as a phenyl group and a naphthyl group; an aralkyl group such as a benzyl group, a phenethyl group, a chlorobenzyl group, a dichlorobenzyl group and a naphthylmethyl group.

The above alkyl group, aryl group and aralkyl group may have a substituent, and the substituent for these may include an alkyl group such as a methyl group, an ethyl group and a propyl group; an alkoxy group such as a methoxy group, an ethoxy group and a propoxy group; a halogen atom such as a chlorine atom, a bromine atom, a fluorine atom and an iodine atom; a nitro group, a cyano group, a trifluoromethyl group, etc.

In the formula, $X_6$ represents a hydrogen atom or a halogen atom such as a fluorine atom, a chlorine atom, a bromine atom and an iodine atom.

In the formula $Ar_{41}$ and $Ar_{42}$ each represent an aryl group such as a phenyl group, a naphthyl group and an anthryl group.

The above aryl group may have a substituent, and the substituent therefor may include an alkyl group such as a methyl group, an ethyl group, a propyl group, a butyl group and an amyl group; an alkoxy group such as a methoxy group, an ethoxy group, a propoxy group and a butoxy group; a halogen atom such as a fluorine atom, a chlorine atom, a bromine atom and an iodine atom; a cyano group, a nitro group, a trifluoromethyl group, etc.

The charge transport material comprising the aryl substituted ethylene compound represented by Formula (5) is as follows:

Formula (5):

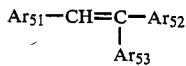

In the formula, $Ar_{51}$ represents an aryl group such as a phenyl group, a diphenyl group, a naphthyl group and anthryl group; or a heterocyclic group such as pyridyl group, a quinolyl group, a carbazolyl group and an indolyl group. $Ar_{52}$ represents an aryl group such as a phenyl group, a diphenyl group, a naphthyl group and anthryl group; or an aralkyl group such as a benzyl group, a phenethyl group and a naphthyl group. $Ar_{53}$ represent a hydrogen atom, an alkyl group, a substituted or unsubstituted aryl group, or a substituted or unsubstituted aralkyl group.

The above aryl group, aralkyl group and heterocyclic group may have a substituent, and the substituent for these may include an alkyl group such as a methyl group, an ethyl group, a propyl group, a butyl group and an amyl group; a di-substituted amino group such as a dimethylamino group, a diethylamino group, a dipropylamino group, a dibutylamino group, a dibenzylamino group, a diphenylamino group, a ditolylamino group, a dixylylamino group, a di(chlorophenyl)amino group, a di(methoxyphenyl)amino group, an N,N-methyl-ethylamino group, an N,N-methyl-phenylamino group, an N,N-ethyl-phenylamino group, an N,N-methyl-benzylamino group, an N,N-ethyl-benzylamino group, an N,N-phenylbenzylamino group, an N,N-phenyl-tolylamino group, an N,N-(methoxyphenyl)-phenylamino group and an N,N-(chlorophenyl)-phenylamino group; a cyclic amino group such as a morpholino group, a pyrrolidino group and a piperidino group; an alkoxy group such as a methoxy group, an ethoxy group, a propoxy group and a butoxy group; a halogen atom such as a fluorine atom, a chlorine atom, a bromine atom and an iodine atom; a cyano group, a trifluoromethyl group, etc.

The charge transport material comprising the pyrazoline compound represented by Formula (6) is as follows:

Formula (6):

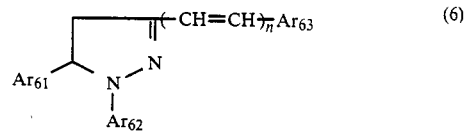

In the formula, $Ar_{61}$, $Ar_{62}$ and $Ar_{63}$ each represent an aryl group such as a phenyl group, a diphenyl group, a naphthyl group and an anthryl group; or a monovalent heterocyclic group derived from pyridine, quinoline carbazole, phenothiazine or phenoxazine. n represents 1 or 2.

The above aryl group and heterocyclic group may have a substituent, and the substituent for these may include an alkyl group such as a methyl group, an ethyl group, a propyl group, a butyl group and an amyl group; a disubstituted amino group such as a dimethylamino group, a diethylamino group, a dipropylamino group, a dibutylamino group, a dibenzylamino group, a diphenylamino group, a ditolylamino group, a dixylamino group, a di(chlorophenyl)amino group, a di(methoxyphenyl)amino group, an N,N-methylethylamino group, an N,N-methyl-phenylamino group, an N,N-ethyl-phenylamino group, an N,N-methyl-benzylamino group, an N,N-ethyl-benzylamino group, an N,N-phenylbenzylamino group, an N,N-phenyl-tolylamino group, an N,N-(methoxyphenyl)-phenylamino group and an N,N-(chlorophenyl)-phenylamino group; a cyclic amino group such as a morpholino group, a pyrrolidino group and a piperidino group; an alkoxy group such as a methoxy group, an ethoxy group, a propoxy group and a butoxy group; a halogen atom such as a fluorine atom, a chlorine atom, a bromine atom and an iodine atom; a cyano group, a trifluoromethyl group, etc.

The charge transport material comprising the diphenyl compound represented by Formula (7) is as follows:

Formula (7):

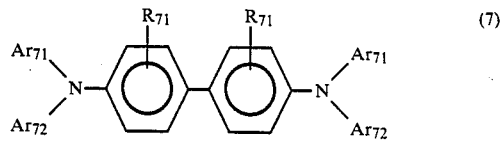

In the formula, $R_{71}$ represents a hydrogen atom, or an alkyl group such as a methyl group, an ethyl group, a propyl group, a butyl group and an amyl group; a halogen atom such as a fluorine atom, a chlorine atom, a bromine atom and an iodine atom; an alkoxy group such as a methoxy group, an ethoxy group, a propoxy group and a butoxy group; a nitro group, a cyano group, a trifluoromethyl group, etc.

In the formula, $Ar_{71}$ and $Ar_{72}$ each represent an alkyl group such as a methyl group, an ethyl group, a propyl group, a butyl group and an amyl group; an aryl group such as a phenyl group, a diphenyl group, a naphthyl group and an anthryl group; an aralkyl group such as a benzyl group, a phenethyl group, a chlorobenzyl group, a dichlorobenzyl group and a naphthylmethyl group.

The above aryl group and aralkyl group may have a substituent, and the substituent for these may include an alkyl group such as a methyl group, an ethyl group, a propyl group, a butyl group and an amyl group; a halogen atom such as a fluorine atom, a chlorine atom, a bromine atom and an iodine atom; an alkoxy group such as a methoxy group, an ethoxy group and a propoxy group; a cyano group, a nitro group, a trifluoromethyl group, etc.

The charge transport material comprising the terphenyl compound represented by Formula (8) is as follows:

Formula (8):

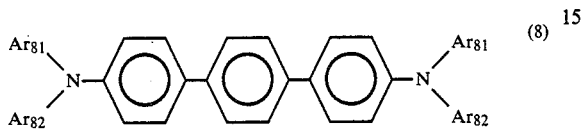

In the formula, $Ar_{81}$ and $Ar_{82}$ each represent an aryl group such as a phenyl group, a diphenyl group, a naphthyl group and anthryl group.

The above aryl group may have a substituent, and the substituent therefor may include an alkyl group such as a methyl group, an ethyl group, a propyl group, a butyl group and an amyl group; a halogen atom such as a fluorine atom, a chlorine atom, a bromine atom and an iodine atom; an alkoxy group such as a methoxy group, an ethoxy group and a propoxy group; a cyano group, a nitro group, a trifluoromethyl group, etc.

Typical examples of the charge transport materials are shown below by chemical formulas.

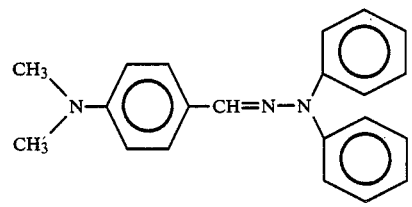

II-1

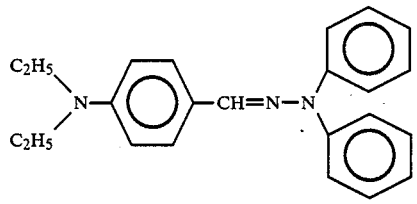

II-2

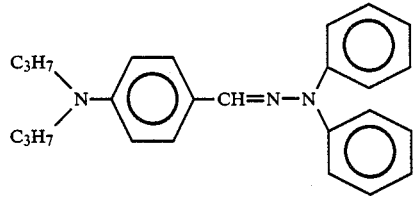

II-3

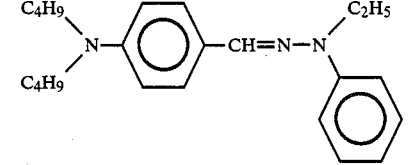

II-4

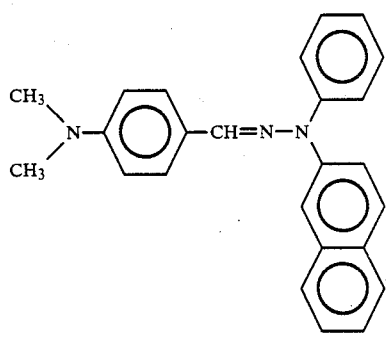

II-5

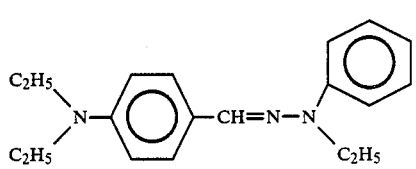

II-6

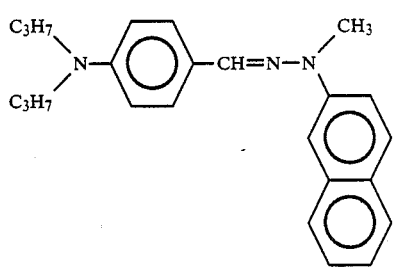

II-7

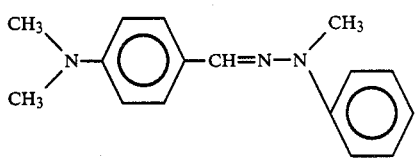

II-8

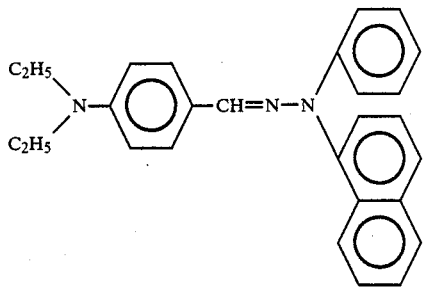

II-9

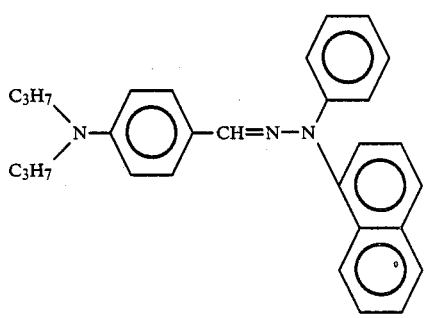

II-10

-continued
II-11
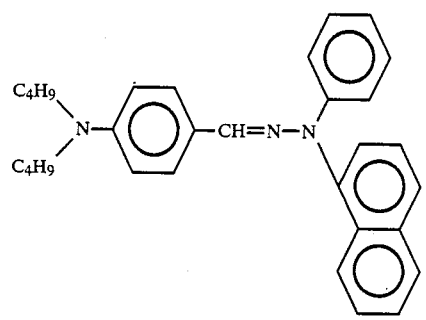
II-16
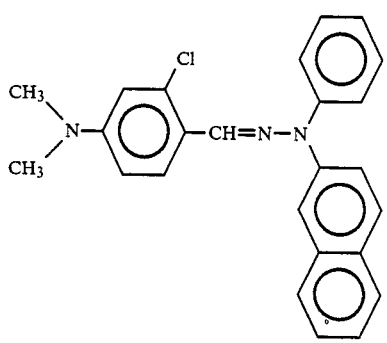
II-12
II-17
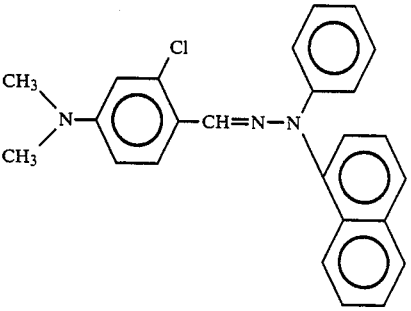
II-13
II-18
II-14
II-19
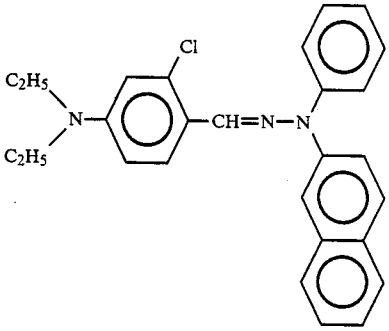
II-15
II-20
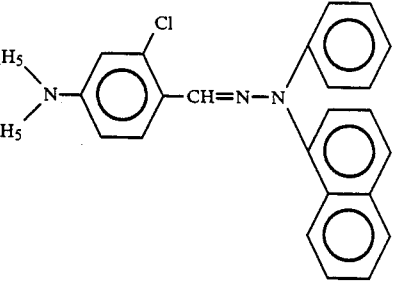
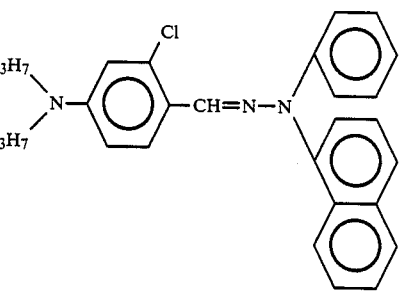

-continued
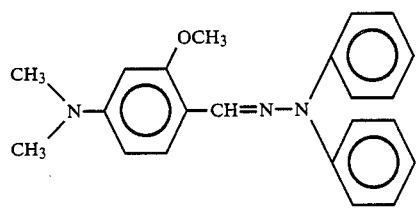 II-21
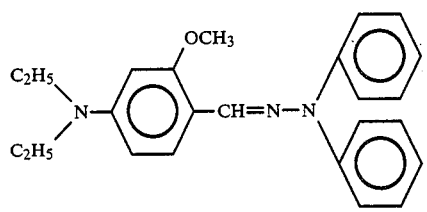 II-22
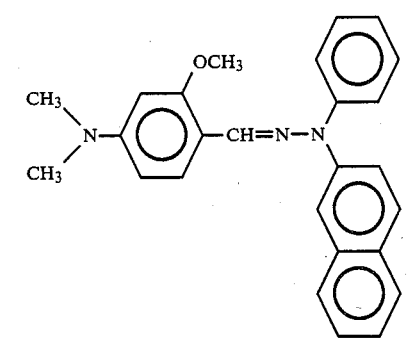 II-23
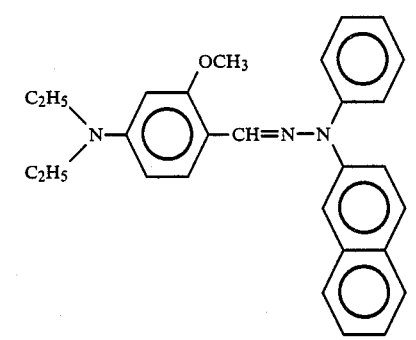 II-24
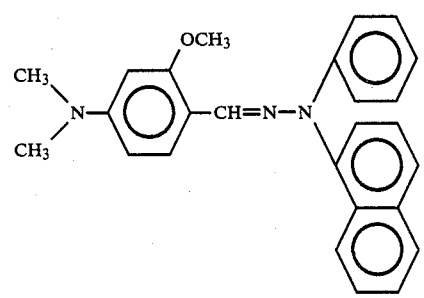 II-25
-continued
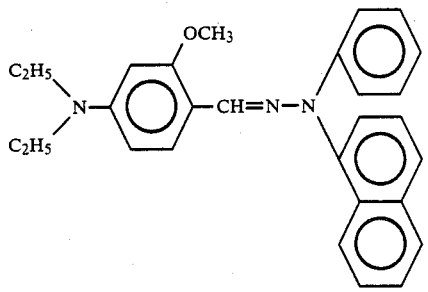 II-26
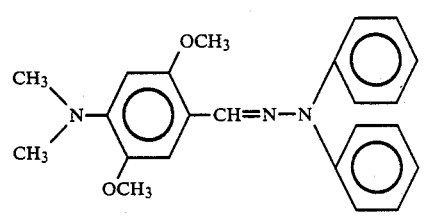 II-27
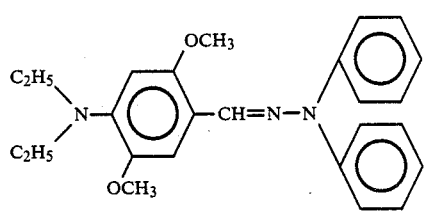 II-28
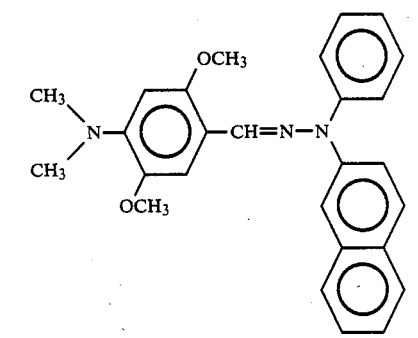 II-29
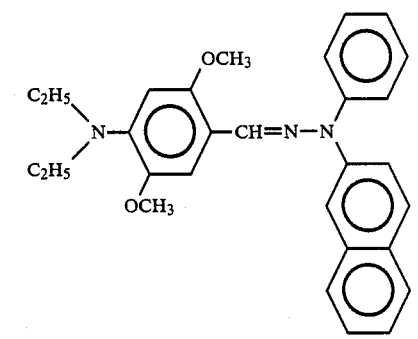 II-30

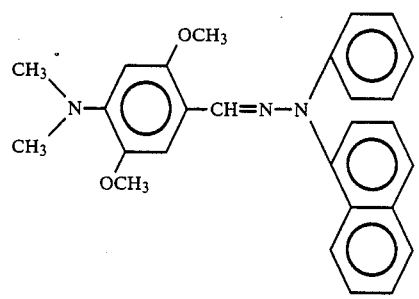
II-31
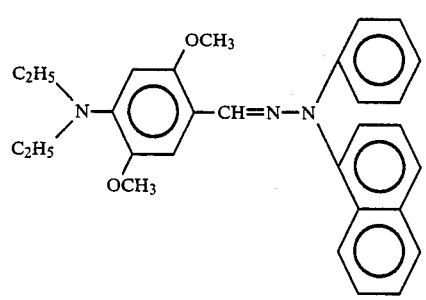
II-32
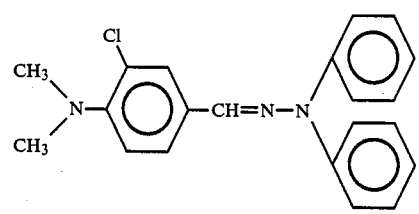
II-33
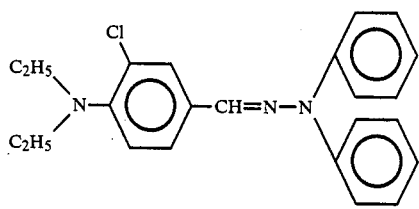
II-34
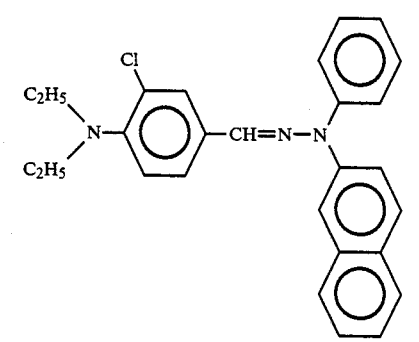
II-35
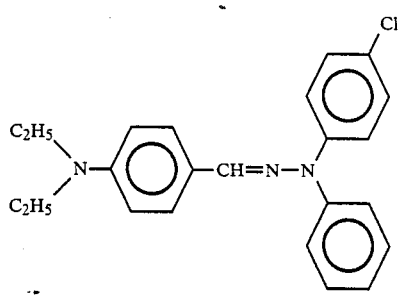
II-36
II-37
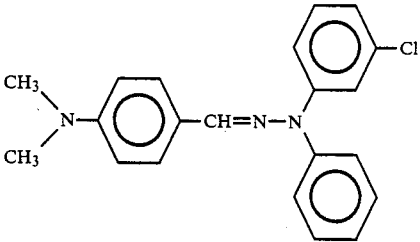
II-38
II-39
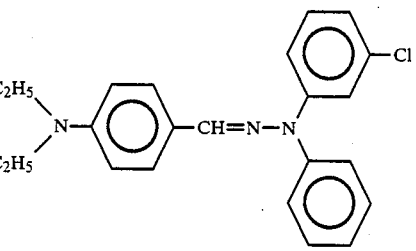
II-40

-continued
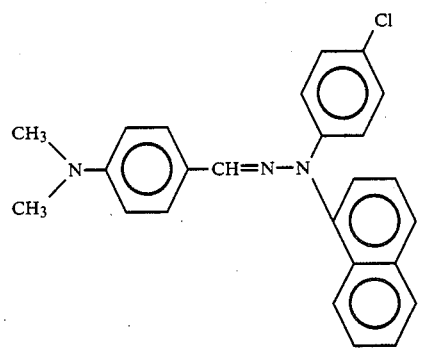 II-41
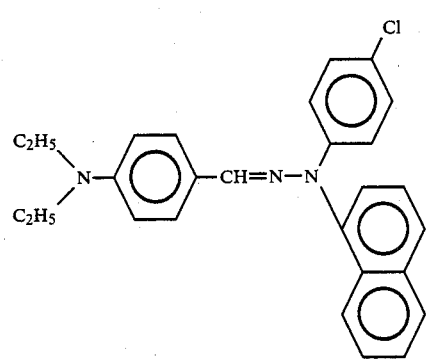 II-42
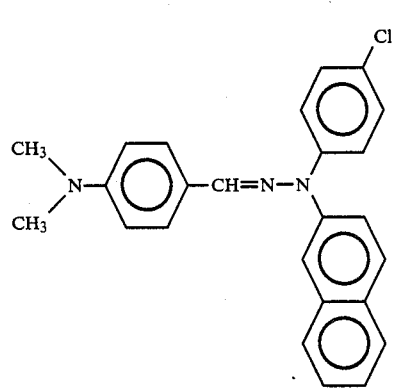 II-43
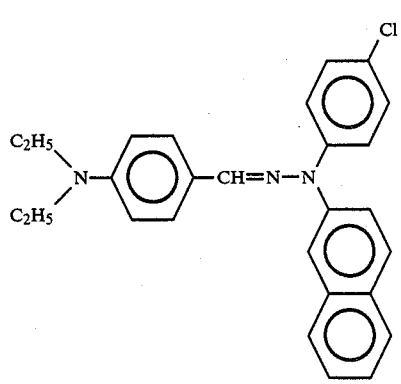 II-44
-continued
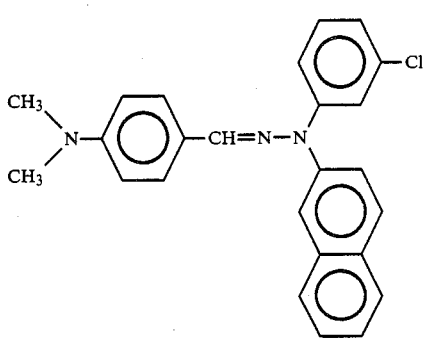 II-45
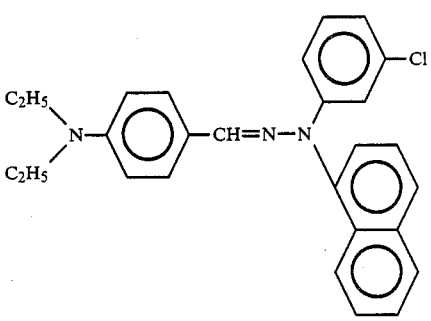 II-46
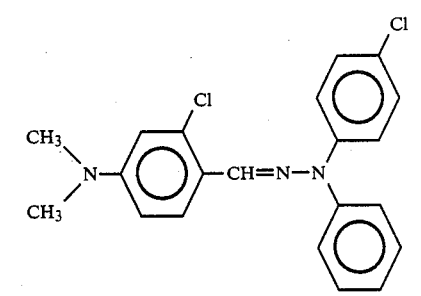 II-47
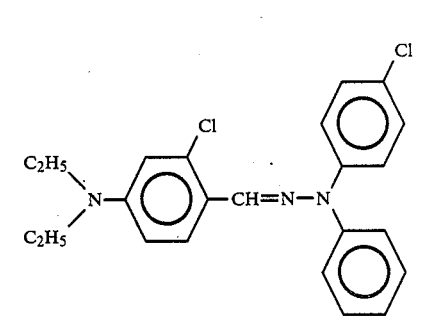 II-48
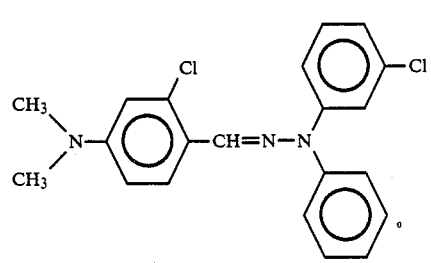 II-49

-continued
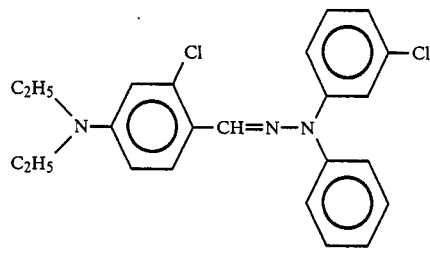 II-50
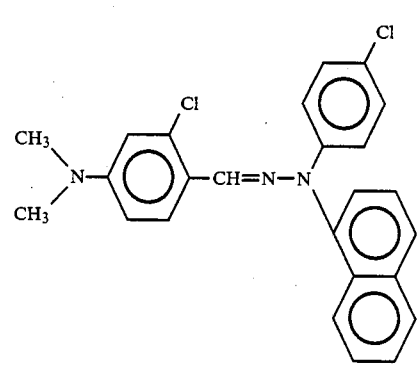 II-51
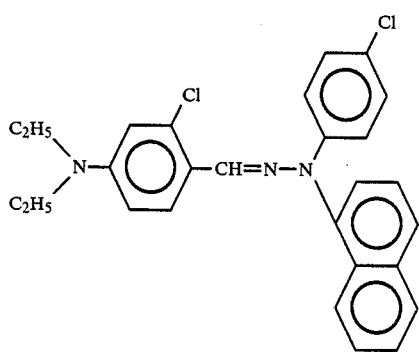 II-52
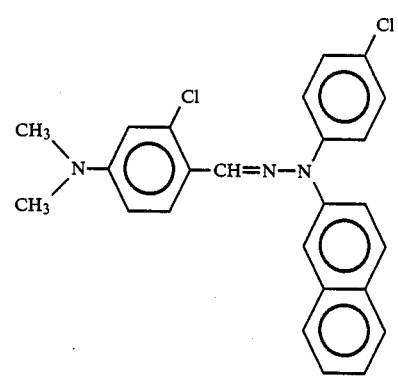 II-53
-continued
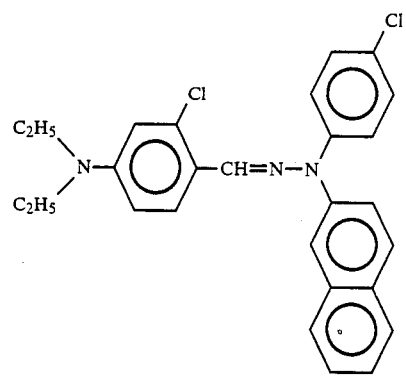 II-54
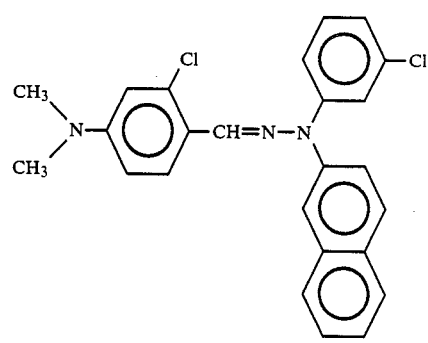 II-55
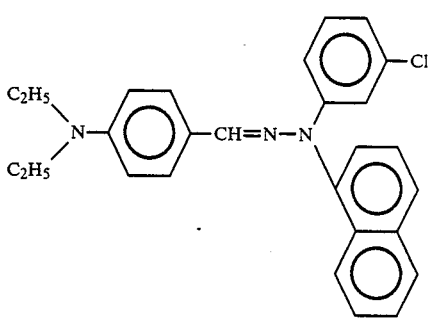 II-56
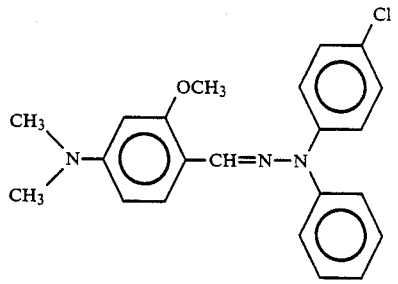 II-57
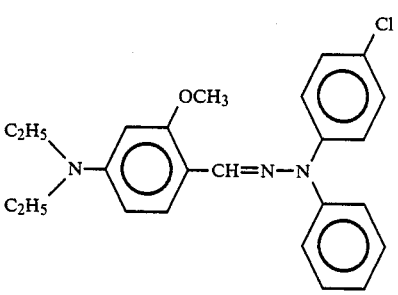 II-58

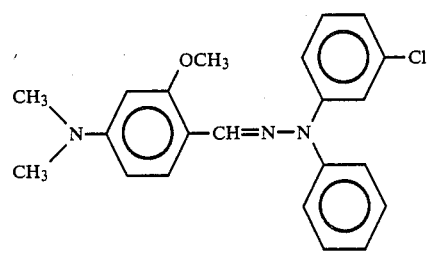 II-59
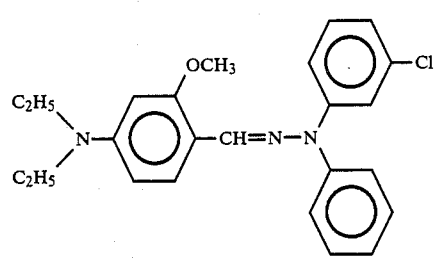 II-60
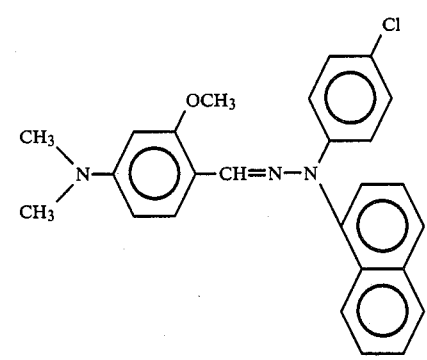 II-61
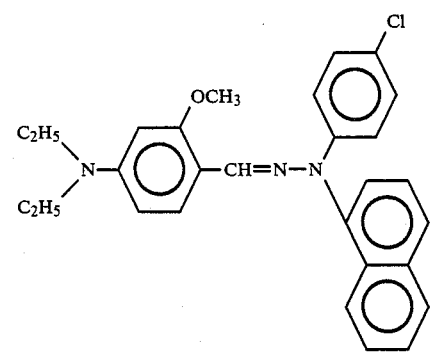 II-62
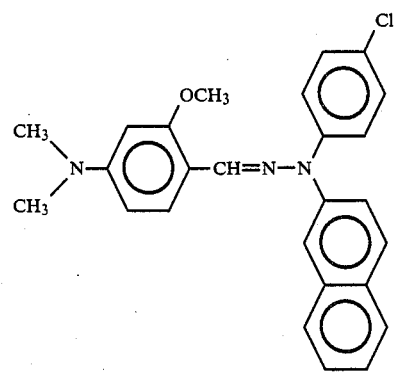 II-63
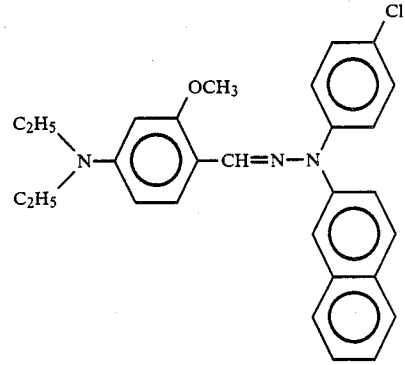 II-64
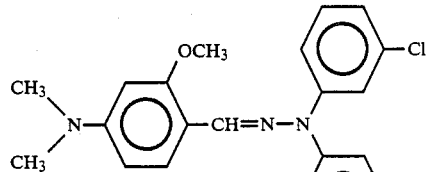 II-65
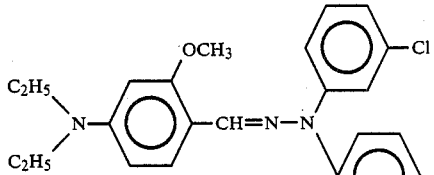 II-66
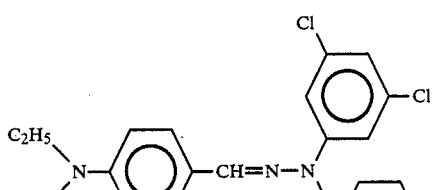 II-67
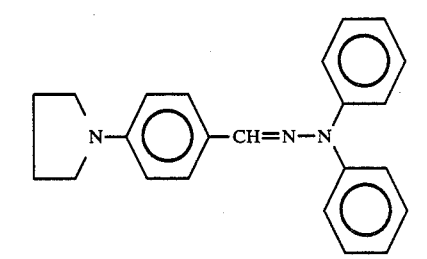 II-68

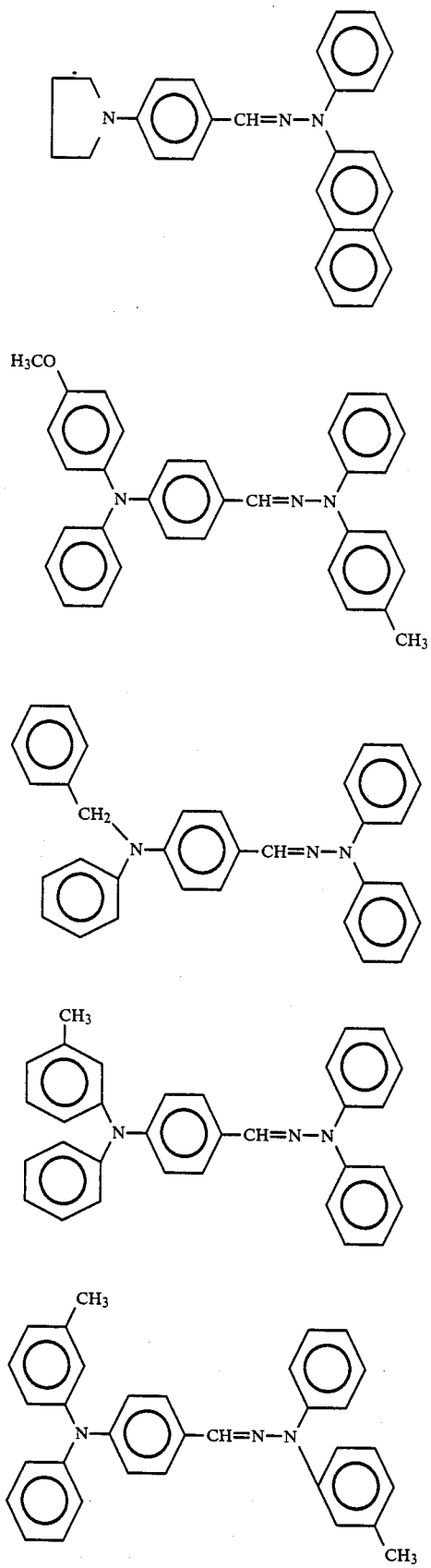

-continued
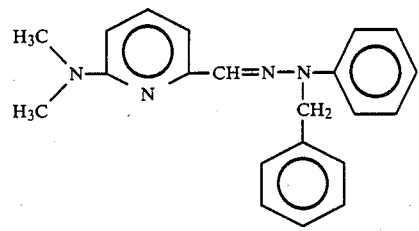
II-81
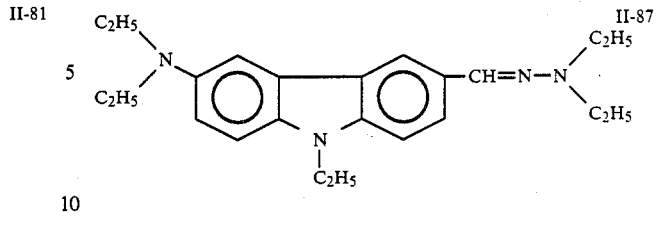
II-87
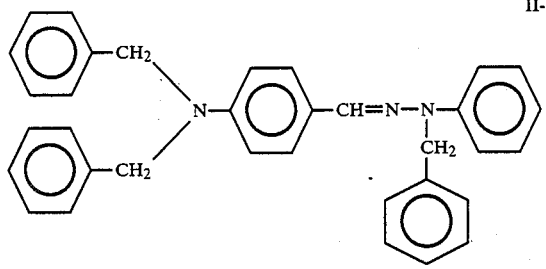
II-82
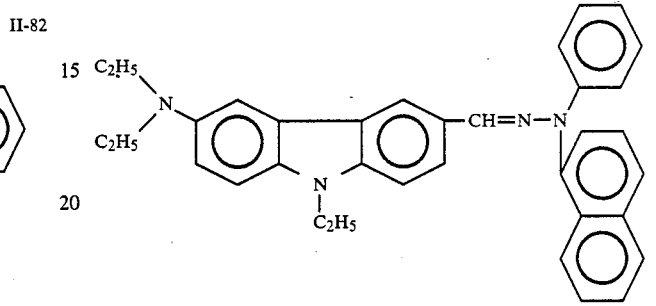
II-88
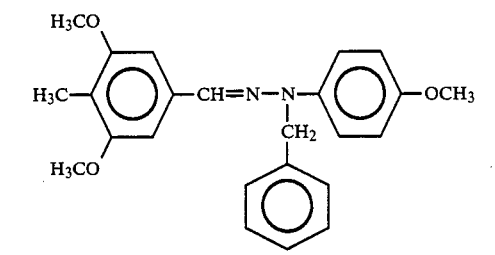
II-83
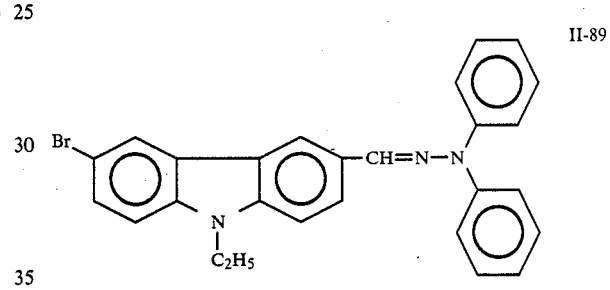
II-89
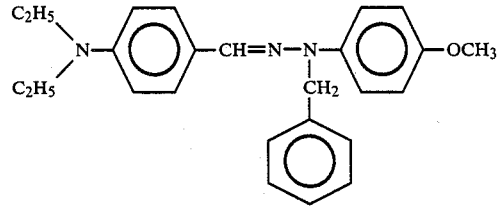
II-84
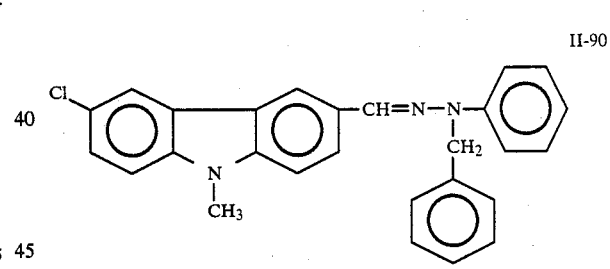
II-90
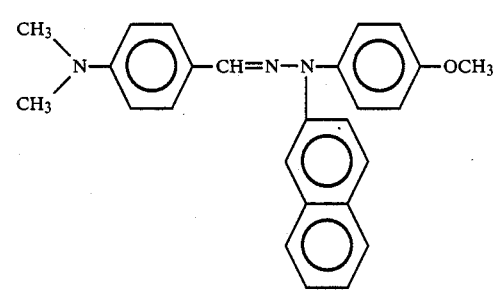
II-85
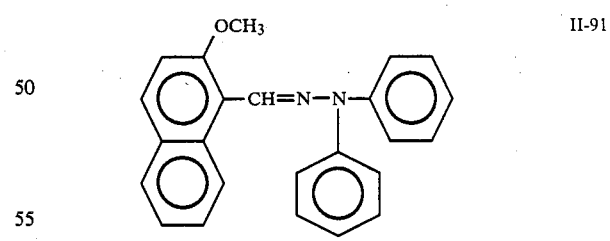
II-91
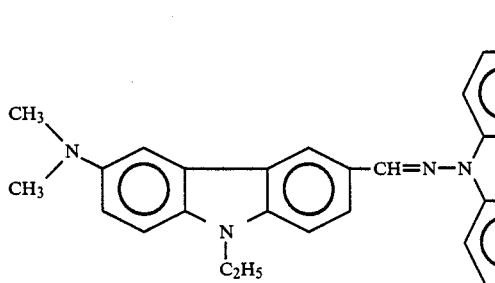
II-86
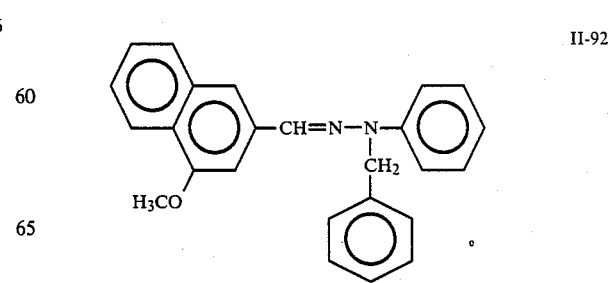
II-92

II-93 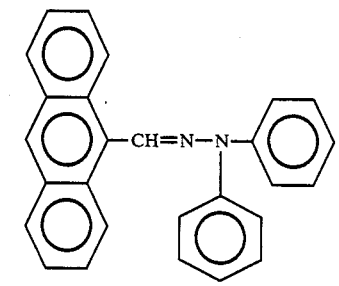
II-94 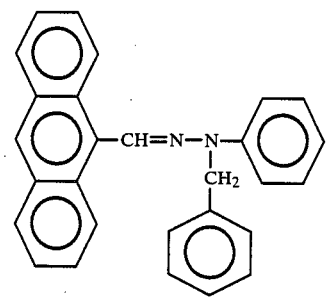
II-95 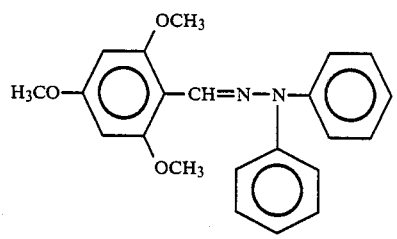
II-96 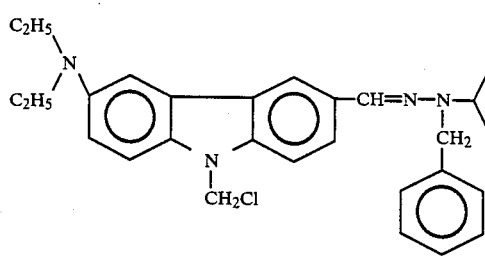
II-97 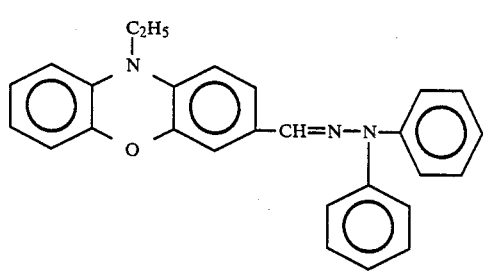
III-1 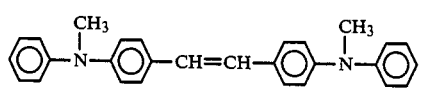
III-2 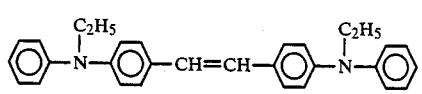
III-3 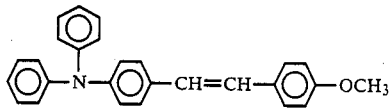
III-4 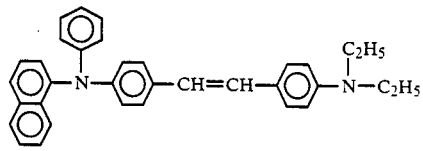
III-5 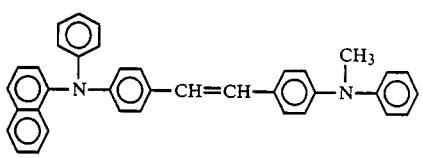
III-6 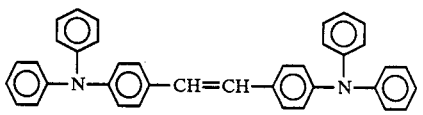
III-7 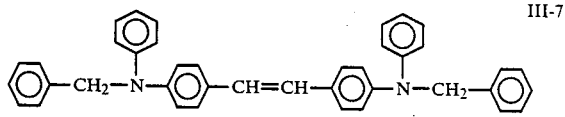
III-8 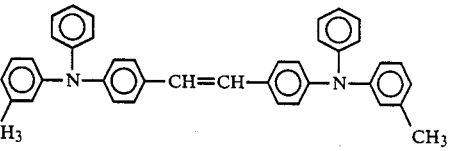
III-9 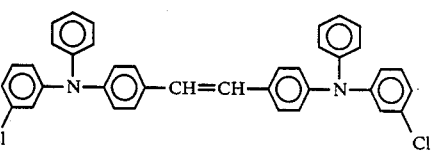
III-10 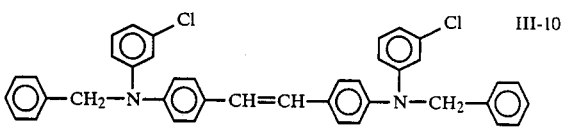
III-11 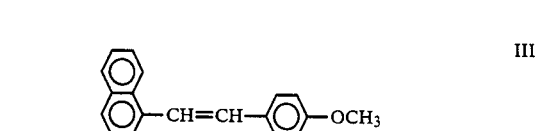
III-12 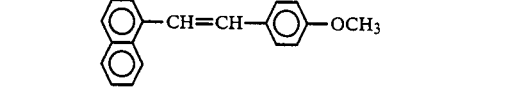

III-13 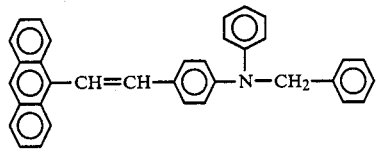
III-14 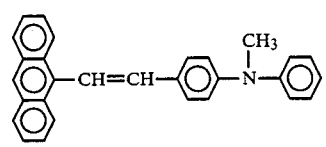
III-15 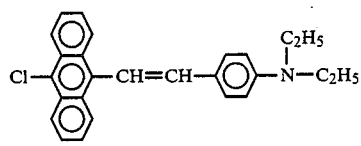
III-16 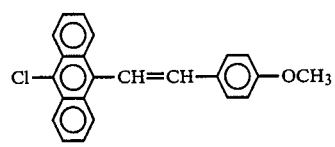
III-17 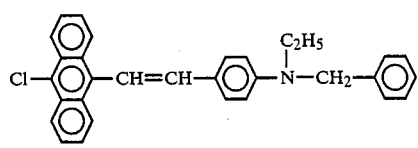
III-18 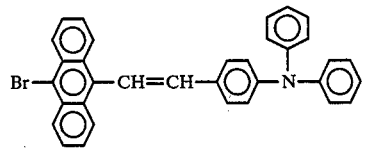
III-19 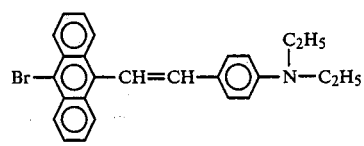
III-20 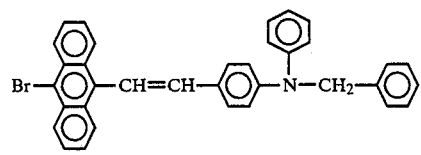
III-21 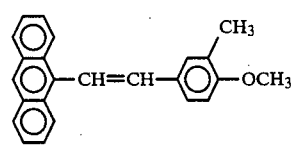
III-22 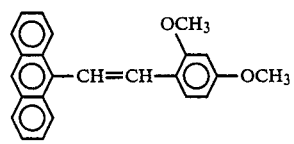
III-23 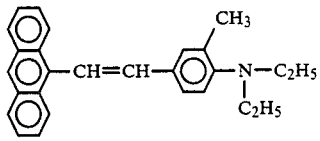
III-24 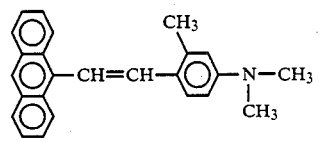
III-25 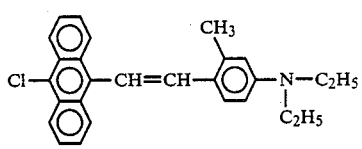
III-26 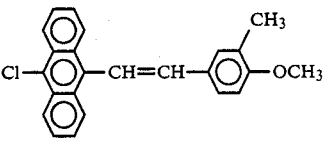
III-27 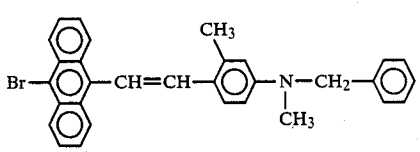
III-28 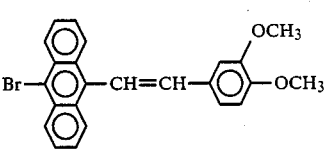
III-29 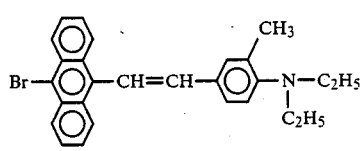
III-30 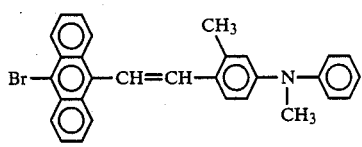
III-31 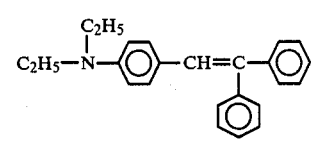
III-32 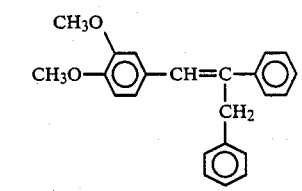

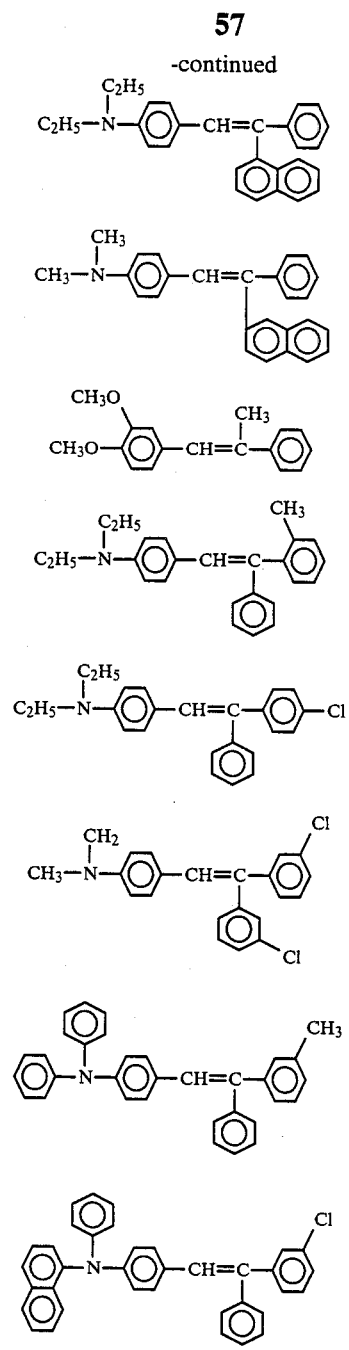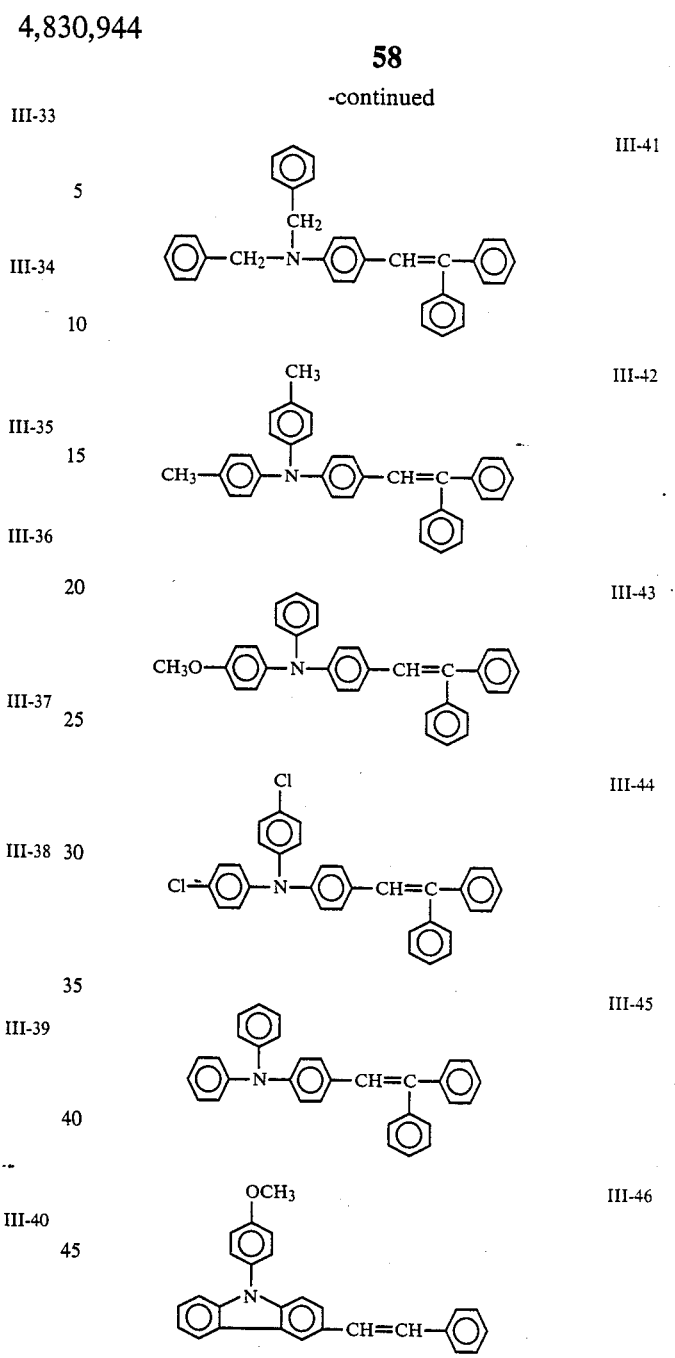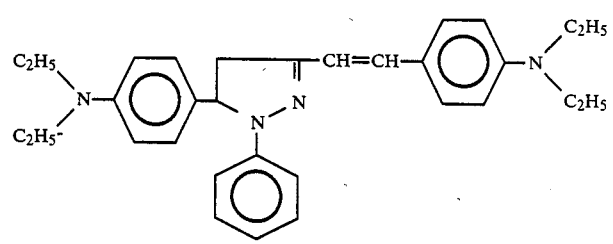

-continued
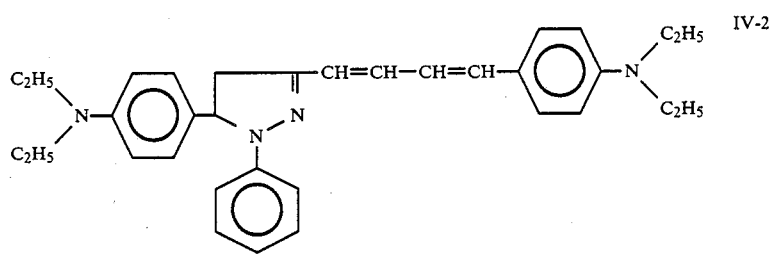 IV-2
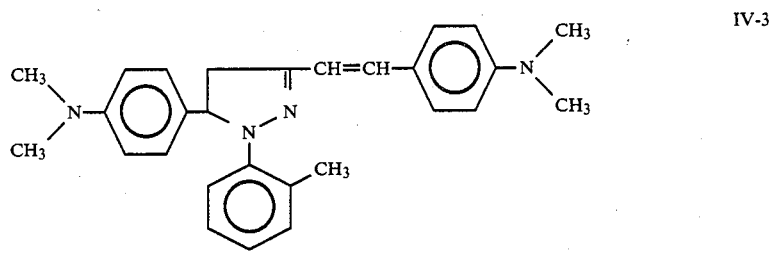 IV-3
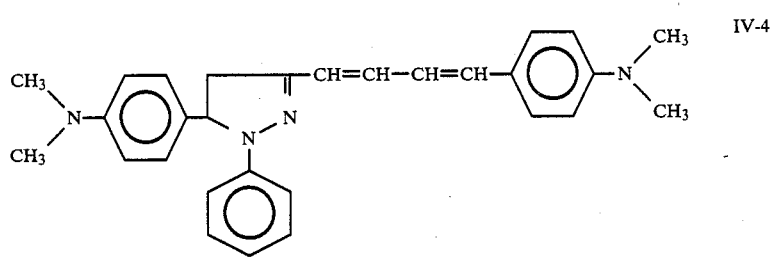 IV-4
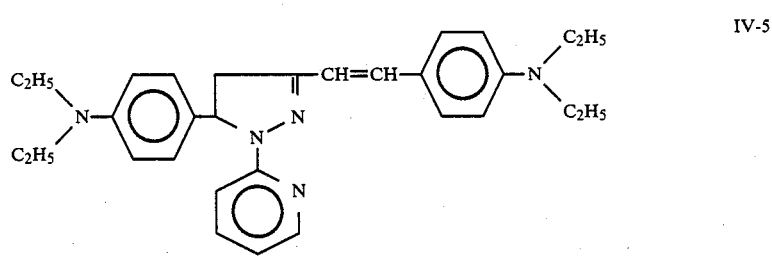 IV-5
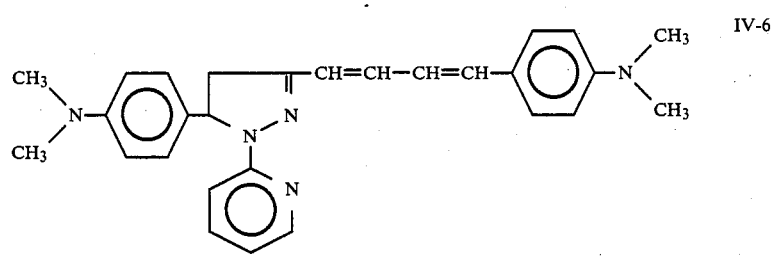 IV-6
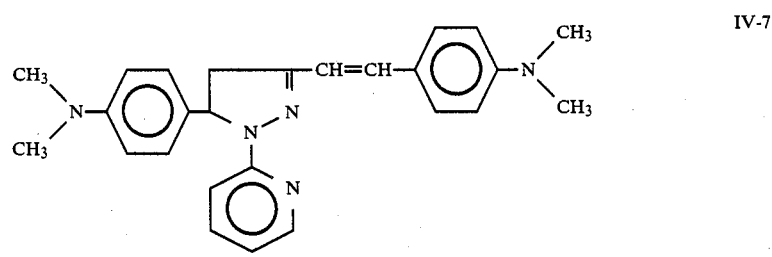 IV-7

-continued
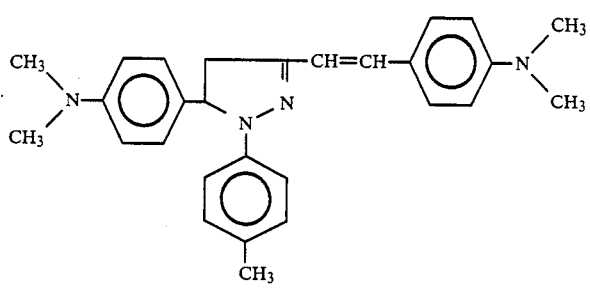
IV-8
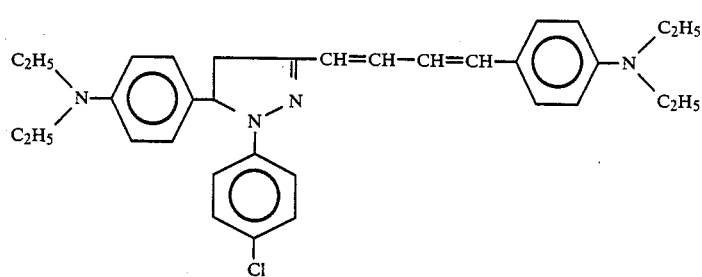
IV-9
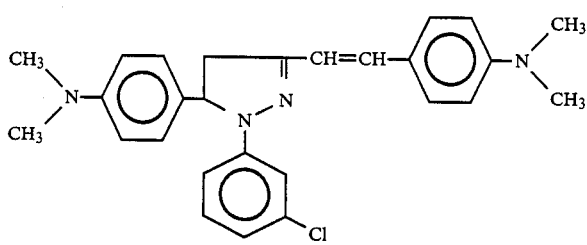
IV-10
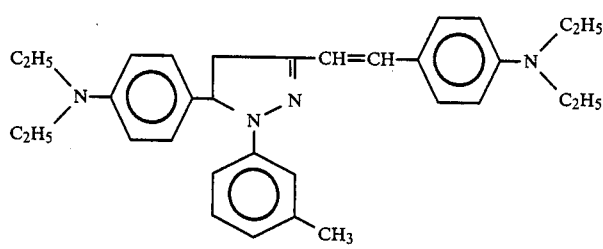
IV-11
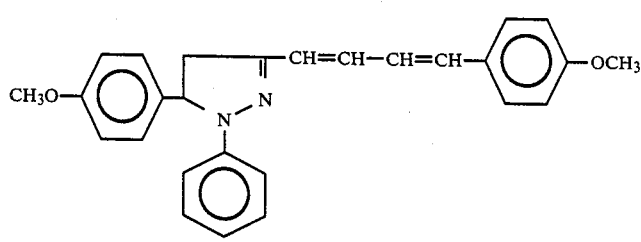
IV-12
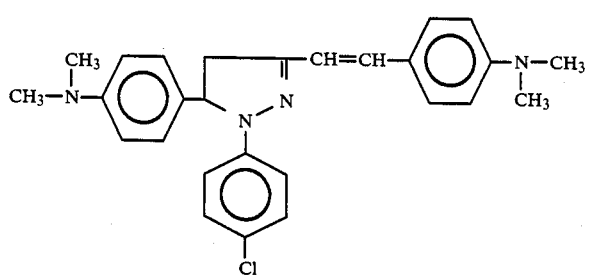
IV-13

-continued
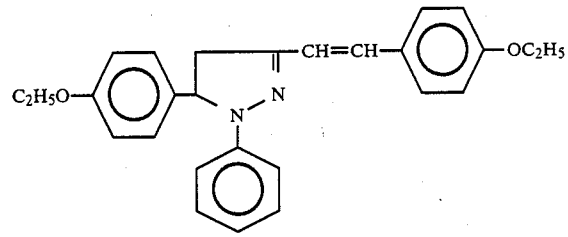
IV-14
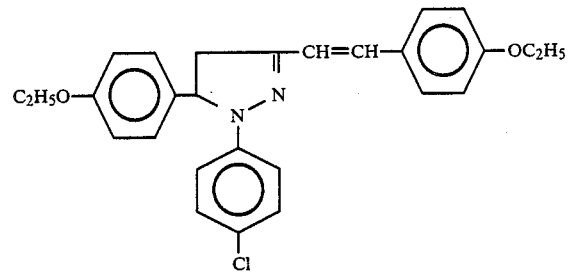
IV-15
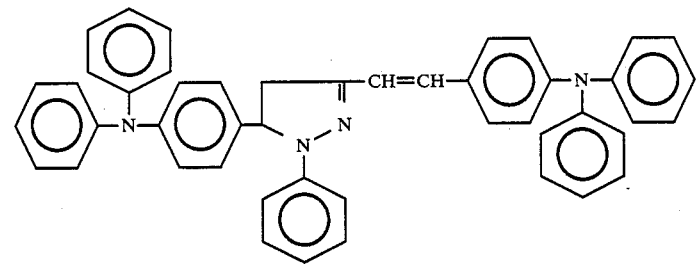
IV-16
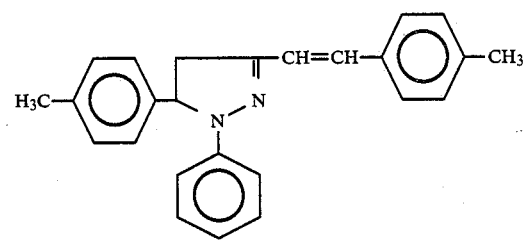
IV-17
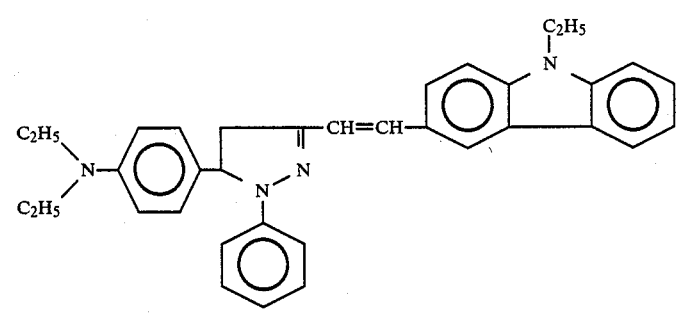
IV-18
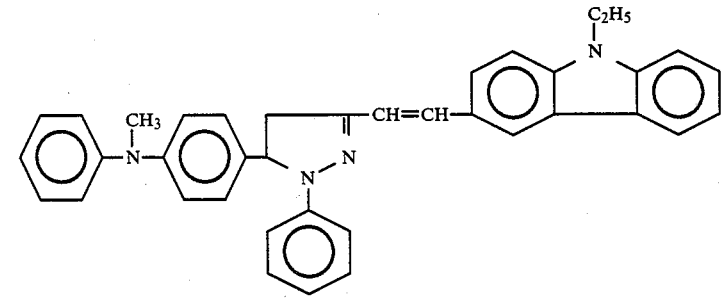
IV-19

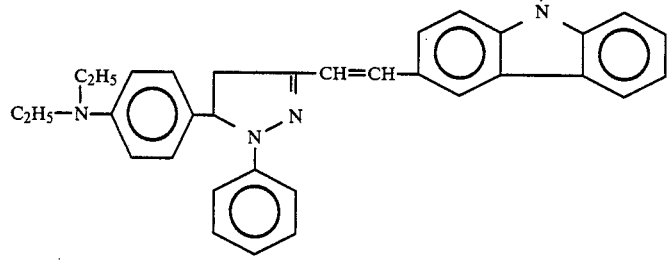

-continued

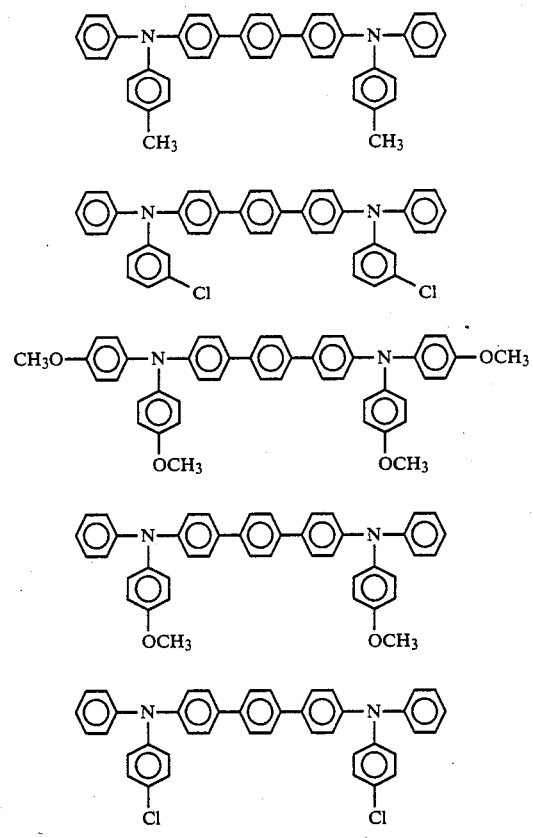

The charge transport layer is electrically connected to the above-mentioned charge generation layer, and it accepts charge carriers injected from the charge generation layer in the presence of an electric field and simultaneously has a function that can transport these charge carriers to the surface. In this instance, this charge transport layer may be laminated above the charge generation layer or may be laminated below the same. However, when the charge generation layer is an uppermost layer, it may sometimes occur that the coating is scraped during repeated use to cause a change in the sensitivity. In such a case, it is preferred that the charge transport layer is laminated above the charge generation layer.

When the charge transport layer is formed on the charge generation layer, the material which transports charge carriers in the charge transport layer (hereinafter simply "charge transport material") is preferably substantially non-responsive to the wavelength of an electromagnetic wave to which the above charge generation layer can respond. This is for the purpose of preventing the charge transport layer from having a filter effect and the sensitivity from being lowered. The "electromagnetic wave" mentioned here is included in the definition for "light" in a broad sense, including gamma rays, X-rays, ultraviolet rays, visible light, near infrared rays, and so forth.

When the charge transport materials shown in the above Formulas (3) to (8) have no film formation ability, the coating can be formed by selecting a suitable binder. Resins usable as the binder may include, for example, resins having insulating properties such as acrylic resins, polyarylate, polyester, polycarbonate, bisphenols of A type and Z type, polystyrene, an acrylonitrile/styrene copolymer, a acrylonitrile/butadiene copolymer, polyvinyl butyral, polyvinyl formal, polysulfone, polyacrylamide, polyamide and chlorinated rubber, or organic photoconductive polymers such as poly-N-vinyl carbazole, polyvinyl anthracene and polyvinyl pyrene.

The charge transport layer has a limit by which the charge carriers can be transported, and therefore can not have an unnecessarily greater film thickness. In general, it may have a thickness of 5 μm to 30 μm, preferably in the range of 8 μm to 20 μm. When the charge transport layer is formed by coating, there can be used the coating methods having been mentioned above.

The photosensitive layer having the laminated structure comprising the charge generation layer and the charge transport layer as described above is provided on a substrate having a conductive layer. As the substrate having a conductive layer, there can be used a substrate such that the substrate itself has the conductivity, for example, substrates made of aluminum, an aluminum alloy, copper, zinc, stainless steel, vanadium, molybdenum, chromium, titanium, nickel, indium, gold or platinum. Besides these, there can be used plastics (for example, polyethylene, polypropylene, polyvinyl chloride, polyethylene terephthalate, acrylic resins, polyethylene fluoride, etc.) having a layer on which a coating has been formed by vaccum deposition of metals such as aluminum, an aluminum alloy, indium oxide, tin oxide, an indium oxide/tin oxide alloy; substrates obtained by coating plastics or the above conductive substrates with conductive particles (for example, aluminum powder, titanium oxide, tin oxide, zinc oxide, carbon black, silver powder, etc.) together with suitable binders; substrates obtained by impregnating plastics or paper with conductive particles, or plastics comprising a conductive polymer, etc.

A subbing layer having a function as a barrier and a function of adhesion can be provided between the conductive layer and the photosensitive layer. The subbing layer can be formed using casein, polyvinyl alcohol, nitrocellulose, an ethylene/acrylic acid copolymer, polyamide (such as nylon 6, nylon 66, nylon 610, a copolymer nylon, and an alkoxymethylated nylon), polyurethane, gelatin, aluminum oxide, etc.

The subbing layer may suitably have a film thickness of 0.1 μm to 5 μm, preferably 0.5 μm to 3 μm.

When the charge transport material comprises an electron transporting material in an embodiment where a photosensitive member obtained by laminating the conductive layer, the charge generation layer and the charge transport layer in this order is used, the surface of the charge transport layer need to be positively charged, and, upon exposure after having been charged, electrons formed in the charge generation layer are injected into the charge transport layer at an exposed portion, and thereafter reach the surface to neutralize the positive charge, thereby causing decay of surface potential to give an electrostatic contrast between the exposed position and an unexposed portion. An electrostatic latent image thus formed may be developed with a toner negatively charged to obtain a visible image. The image formed may be directly fixed, or may be transferred to paper or a plastic film, followed by developing and fixing.

Also, there can be employed a method in which the electrostatic latent image on the photosensitive member is transferred onto an insulating layer of a transfer sheet, and thereafter developed and fixed. As for the kind of a developing agent, or the developing method and the fixing method, any of those conventionally known or available may be employed, without any limitation to specific ones.

On the other hand, when the charge transport material comprises a hole transporting material, the surface of the charge transport layer need be negatively charged, and, upon exposure after having been charged, holes formed in the charge generation layer are injected into the charge transport layer at an exposed portion, and thereafter reach the surface to neutralize the negative charge, thereby causing decay of surface potential to give an electrostatic contrast between the exposed portion and an unexposed portion. At the time of developing, a positively chargeable toner need to be uesd, contrary to the case where the electron transporting material is used. In any of the photosensitive members, the photosensitive members can be made to have high sensitivity or can be prepared as panchromatic photosensitive member, by incorporating therein the disazo pigment represented by Formula (1) or (2) and at least one charge transporting material selected from the compounds represented by Formulas (3) to (8), and by optionally using together, other photoconductive pigments or dyes having a different absorbance.

According to this invention, it is possible to obtain a photosensitive member having been improved in either or both of the carrier generation efficiency or carrier transport efficiency in the inside of a photosensitive layer, having a flat and high sensitivity over a photosensitive wavelength region extending to a long wavelength region, and having excellent potential stability during long term use. In particular, the effect can be increased when the hydrazone compound, the aryl substituted ethylene compound, the pyrazoline compound, the diphenyl compound and the terphenyl compound are used as the charge transport material in combination.

The electrophotographic photosensitive member of this invention can be not only utilized in infrared electrophotographic copying machines (or laser beam printers), but also widely used in many fields of application as in digital recording systems such as digital electrophotographic copying machines, LED printers, liquid crystal printers, laser engraving, and CRT printers.

This invention will be described by the following Examples.

Examples 1 to 41

Aluminum plates were coated with an ammonium aqueous solution containing casein (casein: 11.2 g; 28% ammonia water: 1 g; water: 222 ml) by use of a Meyer bar to have a film thickness of 0.5 μm after drying, followed by drying.

Next, coating solutions were prepared by adding 5 g each of the disazo pigments listed in Table 1 to a solution obtained by dissolving 2 g of butyral resin (butyral degree: 63 mole %) in 95 ml of isopropyl alcohol.

Each of the coating solutions was dispersed for 4 hours using an attritor, and applied on the above casein subbing layer to have a film thickness of 0.2 μm after drying, followed by drying to form a charge generation layer.

Subsequently, 5 g of each of the charge transport materials listed in Table 1 and 5 g of each of polymethylmethacrylate resins (average molecular weight: 100,000) were dissolved in 70 ml of benzene, and the solutions obtained each were applied on the charge generation layer to have a film thickness of 15 μm after drying, followed by drying to form a charge transport layer.

The thus produced 41 kinds of photosensitive members were subjected to corona charging at −5 kV according to a static method using a converted machine of an electrostatic copying machine (Model SP-428; produced by Kawaguchi Denki K.K., Japan) in which a semiconductor laser of 780 nm and a scanning unit were replaced by a tungsten light source, retained in a dark place for 1 second, and then exposed to laser light to examine the charging characteristics. The charging characteristics were evaluated by measuring the surface potential ($V_0$) and the exposure dosage ($E_{1/5}$) necessary for decaying the potential after 1 second dark decay to 1/5 potential. The spectral absorbency of the above photosensitive members was also measured using an instantaneous multi-measurement detector (MCPD-100, produced by Union Giken K.K., Japan) to evaluate a photosensitive wavelength region. The evaluation was carried out, as shown in FIG. 1, based on the wavelength (λd) showing a steep trail in the spectral absorption waveform, and Value F at the ratio of the peak (Hλ 800) of spectral absorption at 800 nm to the peak (Hλ 760) at 760 nm, namely:

$$\frac{H\lambda\ 800}{H\lambda\ 760} \times 100 = F\ (Flatness)$$

Meanwhile, the waveform measured by MCPD-100 shows a very good agreement with the sensitivity waveform obtained by using the above Model SP-428 that has not been converted, and replacing a filter.

Results of measurements of the above potential characteristics and photosensitive wavelength region are shown in Table 1.

Comparative Examples 1 to 4

Photosensitive members were produced in the quite same manner as in the above Examples except that a pigment disclosed in Japanese Patent Publication No. 1667/1981, a pigment disclosed in Japanese Patent Laid Open No. 195767/1982, a pigment disclosed in Japanese Patent Laid Open No. 76841/1983 (U.S. Pat. No. 4,433,039) and a pigment disclosed in Japanese Patent Laid Open No. 127933/1983 (U.S. Pat. No. 4,447,513) were used in place of the pigment used in Example 1, and a charge transport material of No. II-72 was used, to make the similar evaluations.

Results of the evaluations in Comparative Examples 1 to 4 are shown in Table 1 together with the results of Examples 1 to 41.

Comparative Example 1: CG material disclosed in Japanese Patent Publication No. 1667/1981; ε-type copper phthalocyanine.

Comparative Example 2: CG material disclosed in Japanese Patent Laid Open No. 195767/1982:

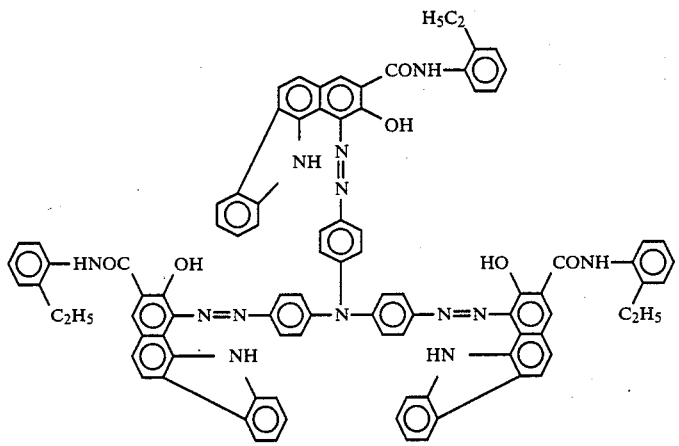
Comparative Example 3: Ditto, No. 76841/1983
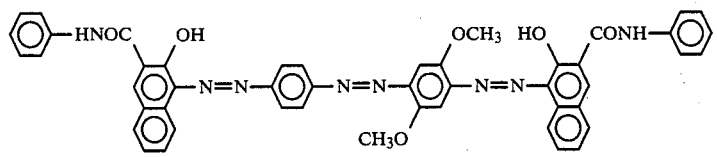
Comparative Example 4: Ditto, No. 127933/1983
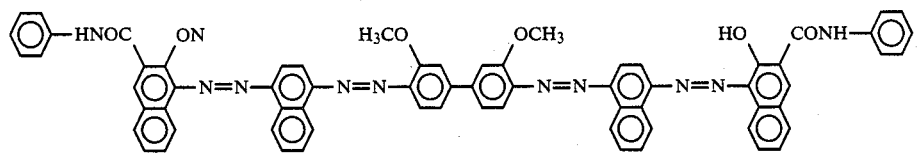
TABLE 1
| | Disazo pigment compound No. | Charge transport material No. | $V_0(-V)$ | $E_{1/5}$ ($\mu j/cm^2$) | $\lambda d$(nm) | F (%) |
|---|---|---|---|---|---|---|
| Example | | | | | | |
| 1 | 2 | II-9 | 600 | 2.8 | 770 | 88 |
| 2 | 5 | II-9 | 605 | 3.2 | 770 | 86 |
| 3 | 13 | II-9 | 605 | 2.0 | 790 | 92 |
| 4 | 15 | II-9 | 600 | 1.5 | 790 | 94 |
| 5 | 17 | II-9 | 600 | 1.9 | 785 | 90 |
| 6 | 19 | II-9 | 600 | 1.5 | 790 | 95 |
| 7 | 22 | II-9 | 585 | 1.8 | 790 | 92 |
| 8 | 25 | II-9 | 600 | 2.1 | 780 | 88 |
| 9 | 27 | II-9 | 605 | 1.8 | 780 | 86 |
| 10 | 32 | II-9 | 610 | 2.4 | 770 | 85 |
| 11 | 33 | II-9 | 590 | 2.6 | 790 | 92 |
| 12 | 36 | II-9 | 585 | 2.5 | 790 | 93 |
| 13 | 49 | II-9 | 600 | 3.0 | 780 | 84 |
| 14 | 53 | II-9 | 610 | 3.0 | 785 | 85 |
| 15 | 58 | II-9 | 595 | 2.8 | 790 | 79 |
| 16 | 61 | II-9 | 595 | 2.8 | 780 | 88 |
| 17 | 66 | II-8 | 600 | 2.9 | 775 | 79 |
| 18 | 74 | II-8 | 600 | 3.2 | 765 | 89 |
| 19 | 78 | II-8 | 610 | 3.1 | 775 | 91 |
| 20 | 81 | II-8 | 610 | 2.7 | 780 | 86 |
| 21 | 89 | II-8 | 605 | 2.5 | 780 | 88 |
| 22 | 9 | II-8 | 600 | 3.8 | 770 | 80 |
| 23 | 15 | II-17 | 595 | 2.0 | 775 | 81 |
| 24 | 19 | II-17 | 600 | 2.2 | 775 | 86 |
| 25 | 22 | II-17 | 595 | 2.8 | 790 | 90 |
| 26 | 15 | II-12 | 600 | 1.6 | 790 | 94 |
| 27 | 15 | II-75 | 600 | 2.3 | 790 | 94 |
| 28 | 15 | II-85 | 590 | 1.7 | 790 | 94 |
| 29 | 15 | II-93 | 600 | 2.6 | 790 | 94 |
| 30 | 15 | III-19 | 605 | 3.2 | 785 | 93 |
| 31 | 15 | III-31 | 600 | 2.4 | 790 | 94 |
| 32 | 15 | III-45 | 610 | 2.3 | 785 | 92 |
| 33 | 15 | IV-20 | 600 | 2.3 | 790 | 94 |
| 34 | 19 | II-6 | 605 | 1.6 | 790 | 95 |

TABLE 1-continued

| | Disazo pigment compound No. | Charge transport material No. | $V_0(-V)$ | $E_{1/5}$ ($\mu j/cm^2$) | $\lambda d$(nm) | F (%) |
|---|---|---|---|---|---|---|
| 35 | 19 | IV-5 | 600 | 2.5 | 785 | 94 |
| 36 | 19 | V-1 | 605 | 2.2 | 790 | 93 |
| 37 | 19 | V-9 | 595 | 2.6 | 790 | 94 |
| 38 | 19 | VI-2 | 600 | 2.1 | 785 | 95 |
| 39 | 19 | VI-7 | 605 | 2.4 | 790 | 93 |
| 40 | 19 | III-46 | 600 | 2.2 | 790 | 94 |
| 41 | 19 | IV-1 | 600 | 2.2 | 785 | 92 |
| Comparative Example | | | | | | |
| 1 | | II-72 | 600 | 10.5 | 750 | 25 |
| 2 | | II-72 | 570 | 0.80 | 760 | 50 |
| 3 | | II-72 | 590 | 6.3 | 720 | 15 |
| 4 | | II-72 | 585 | 6.0 | 740 | 30 |

It is seen from the results shown in Table 1 that all of the photosensitive members according to this invention show sufficient sensitivity and potential characteristics, and have a flat photosensitive wavelength region between 760 and 800 nm in practical use, but the comparative examples are accompanied with great defects particularly in the photosensitive wavelength region.

Examples 42 to 46

Using the photosensitive members used in Examples 6, 11, 26, 30 and 36, fluctuation of light portion potential and dark portion potential was measured when they were used repeatedly. The measurement was carried out by pasting the photosenstive member onto a cylinder in an electrophotographic copying machine equipped with a −5.6 kV corona charger, a 780 nm semiconductor laser exposure optical system, a developing device, a transfer charger, a deelectrifying light exposure optical system, and a cleaner. This copying machine is so constructed as to produce an image on a transfer sheet as the cylinder is driven. The initial light portion potential ($V_L$) and the dark portion potential ($V_D$) were set to about −100 V and about −600 V, respectively, by use of the copying machine, and the light portion potential ($V_L$) and the dark portion potential ($V_D$) after repeated use of 5,000 times were measured. Results obtained are shown in Table 2.

TABLE 2

| Photosensitive member No. | | Initial stage | | After 5,000 sheet copying | |
|---|---|---|---|---|---|
| | | $V_D(-V)$ | $V_L(-V)$ | $V_D(-V)$ | $V_L(-V)$ |
| Example | Example | | | | |
| 42 | 6 | 600 | 100 | 610 | 120 |
| 43 | 11 | 590 | 105 | 600 | 120 |
| 44 | 26 | 590 | 85 | 595 | 115 |
| 45 | 30 | 600 | 90 | 595 | 110 |
| 46 | 36 | 610 | 100 | 605 | 130 |

Comparative Example 5

In the same procedures as in Example 42, the photosensitive member produced in Comparative Example 2 was tested for evaluation of the potential durability characteristics. At an initial stage, $V_D$ was −600 V and $V_L$ was −100 V, but, after continuous 5,000 time use, $V_D$ fluctuated to −560 V, and $V_L$ to −240 V. This is presumably because, for one thing, the temperature of the semiconductor laser has risen to cause an oscillated wavelength to shift to long wave side whereby the sensitivity has fallen.

Example 47

An ammonium aqueous solution containing casein (casein: 11.2 g; 28% ammonia water: 1 g; water: 22.2 ml) was applied on an aluminum cylinder according to a dip coating method, followed by drying to form a subbing layer with a coating weight of 1.0 g/m².

Next, 1 part by weight of the exemplary disazo pigment No. 19 mentioned above, 1 part by weight of a butyral resin (Eslec BM-2; produced by Sekisui Kagaku K.K., Japan) and 30 parts by weight of isopropyl alcohol were dispersed for 4 hours using a ball mill dispersion machine. The resulting dispersion was applied on the previously formed subbing layer according to a dip coating method, followed by drying to form a charge generation layer. Here, the layer had a film thickness of 0.3 μm.

Subsequently, 1 part by weight of compound III-3 among the above exemplary charge transport materials, 1 part by weight of a polysulfone resin (P1700; produced by Union Carbide Corp.) and 6 parts by weight of monochlorobenzene were mixed, and the mixture was dissolved with stirring by means of a stirrer. The solution obtained was applied on the charge generation layer according to a dip coating method, followed by drying to form a charge transport layer. Here, the layer had a film thickness of 12 μm.

The photosensitive member thus prepared was subjected to corona discharging at −5 kV, and the surface potential at this time (initial potential: $V_0$) was measured. The surface potential after allowing this photosensitive member to stand for 5 seconds in a dark place was also measured. The sensitivity was evaluated by measuring the exposure dosage necessary for decaying the potential $V_K$ after dark decay to ½ ($E_{\frac{1}{2}}$ microjoule/cm²). During this measurement, a gallium-/aluminum/arsenic ternary system semiconductor laser (output: 5 mW; oscillation wavelength: 780 nm) was used as a light source. Results obtained are as follows:

$V_0$: −540 volt
Potential retention ($V_K/V_0\times 100$): 93%
$E_{\frac{1}{2}}$: 1.2 μJ/cm²

As a next step, a real image formation test was carried out by setting the above photosensitive member in place of a LBP-CX photosensitive member on a laser beam printer (LBP-CX; produced by Canon) which is an electrophotographic system printer of the reversal development system equipped with the same semiconductor laser as in the above. The test was under the following conditions:

Surface potential after primary charging: −700 V; surface potential after image exposure: −150 V (exposure dosage: 1.2 μJ/cm²); transfer potential: +700; developer polarity: negative; process speed: 500 mm/sec; developing condition (developing bias): −450 V; image exposure scanning system: image scanning; exposure before primary charging: whole exposure with red light of 50 lux.sec Image formation was effected by performing line scanning following letter signals and image signals of laser beam, whereby good prints of both letters and images were obtained.

Example 48

A polyvinyl alcohol coating with a film thickness of 0.5 μm was formed on an aluminum face of an aluminum-deposited polyethylene terephthalate film.

Subsequently, the disazo pigment dispersion used in Example 1 was applied on the polyvinyl alcohol layer previously formed by use of a Meyer bar to have a film thickness of 0.5 μm after drying, followed by drying to form a charge generation layer.

As a next step, a solution obtained by dissolving 5 g of the exemplary charge transport material IV-3 and 5 g of a polyarylate resin (a condensation polymer of bisphenol A with a terephthalic acid/isophthalic acid mixture) in 70 ml of tetrahydrofuran was applied on the charge generation layer to have a film thickness of 10 μm after drying, followed by drying to form a charge transport layer.

Charge characteristics and durability characteristics of the photosensitive member thus prepared were measured in the same members as in Example 1 and Example 42. Results obtained are shown in Table 3.

TABLE 3

| $V_0$: −590 V |  |  |  |
| $E_{1/5}$: 3.1 μJ/cm² |  |  |  |
| Durability characteristics: | | | |
| Initial stage | | After 5,000 sheet copying | |
| $V_D$ | $V_L$ | $V_D$ | $V_L$ |
| −600 V | −100 V | −595 V | −130 V |

As will be seen from the results shown in Table 3, there are shown good sensitivity, and good potential stability during continuous use.

Example 49

Example 1 was repeated except that the charge transport layer and the charge generation layer were successively laminated on the casein layer of the aluminum support used in Example 1 and applied with an casein layer to give different layer structure, to form a photosensitive layer, and measurement of the potential was carried out in the same manner as in Example 1. However, the charge polarity was made ⊕. Charge characteristics obtained are shown in Table 4.

TABLE 4

| $V_0$: +550 V |  |  |  |
| $E_{1/5}$: 4.2 μJ/cm² |  |  |  |
| Durability characteristics: | | | |
| Initial stage | | After 5,000 sheet copying | |
| $V_D$ | $V_L$ | $V_D$ | $V_L$ |
| +600 V | +100 V | +570 V | +120 V |

We claim:

1. A function separated type electrophotographic photosensitive member for infrared rays, comprising a combination of a charge generation material and a charge transport material, wherein the electrophotographic photosensitive member for infrared rays contains as the charge generation material a disazo pigment represented by Formula (1) shown below.

Formula (1):

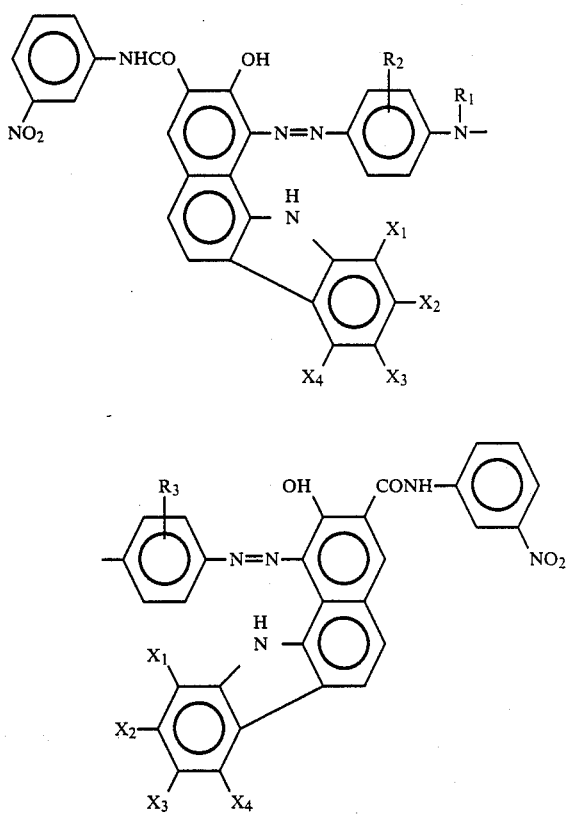

wherein $R_1$ represents a hydrogen atom, a substituted or unsubstituted alkyl group, a substituted or unsubstituted aralkyl group, a substituted or unsubstituted acryl group or a substituted or unsubstituted heterocyclic group; $R_2$ and $R_3$ each represent a hydrogen atom, a substituted or unsubstituted alkyl group, a substituted or unsubstituted alkoxy group, a halogen atom, a nitro group, a cyano group or a trifluoromethyl group; and $X_1$, $X_2$, $X_3$ and $X_4$ each represent a hydrogen atom or a halogen atom, except, however, the case where all of them are hydrogen atoms.

2. The electrophootgraphic photosensitive member infrared rays according to claim 1, wherein said charge generation material is a disazo pigment represented by Formula (2) shown below.

Formula (2):

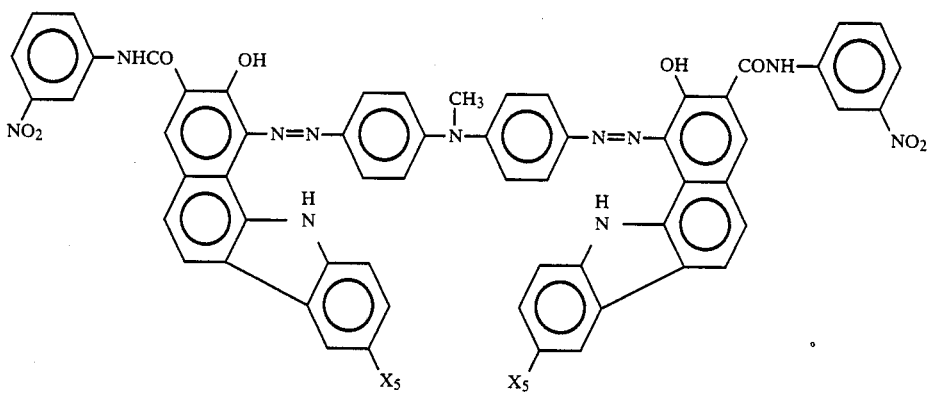

wherein X₅ represents a fluorine atom, a chlorine atom, a bromine atom or an iodine atom.

3. The electrophotographic photosensitive member for infrared rays according to claim 1, wherein said charge transport material is a hydrozone compound represented by Formula (3) shown below.

Formula (3):

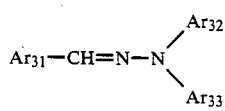

wherein Ar₃₁ represents a substituted or unsubstituted aryl group or a substituted or unsubstituted heterocyclic group; and Ar₃₂ and Ar₃₃ each represent, a substituted or unsubstituted aryl group; an alkyl group; or a substituted or unsubstituted aralkyl group.

4. The electrophotographic photosensitive member for infrared rays according to claim 2, wherein said charge transport material is a hydrazone compound represented by Formula (4) shown below.

Formula (4):

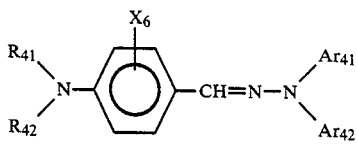

wherein R₄₁ and R₄₂ each represent a substituted or unsubstituted alkyl group, a substituted or unsubstituted aryl group, or a substituted or unsubstituted aralkyl group; X₆ represents a hydrogen atom or a halogen atom; and Ar₄₁ and Ar₄₂ each represent a substituted or unsubstituted aryl group.

5. The electrophotographic photosensitive member for infrared rays according to claim 1, wherein said charge transport material is an aryl substituted ethylene compound represented by Formula (5) shown below.

Formula (5):

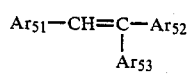

wherein Ar₅₁ represents a substituted or unsubstituted aryl group, or a substituted or unsubstituted heterocyclic group; Ar₅₂ represents a substituted or unsubstituted aryl group, or a substituted or unsubstituted aralkyl group; and Ar₅₃ represents a hydrogen atom, an alkyl group, a substituted or unsubstituted aryl group, or a substituted or unsubstituted aralkyl group.

6. The electrophotographic photosensitive member for infrared rays according to claim 1, wherein said charge transport material is a pyrazoline compound represented by Formula (6) shown below.

Formula (6):

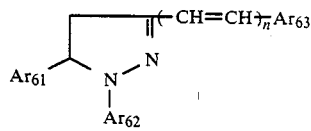

wherein Ar₆₁, Ar₆₂ and Ar₆₃ each represent a substituted or unsubstituted aryl group, or a substituted or unsubstituted heterocyclic group; and n represents 1 or 2.

7. The electrophotographic photosensitive member for infrared rays according to claim 1, wherein said charge transport material is a diphenyl compound represented by Formula (7) shown below.

Formula (7):

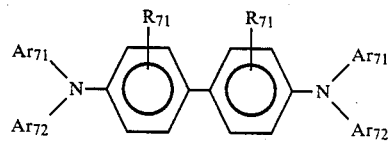

wherein R₇₁ represents a hydrogen atom, a substituted or unsubstituted alkyl group, a usbstituted or unsubstituted alkoxy group, a halogen atom, a nitro group, a cyano group, or a trifluoromethyl group; and Ar₇₁ and Ar₇₂ each represent an alkyl group, a substituted or unsubstituted aryl group, or a substituted or unsubstituted aralkyl group.

8. The electrophotographic photosensitive member for infrared rays according to claim 1, wherein said charge transport material is a terphenyl compound represented by Formula (8) shown below.

Formula (8):

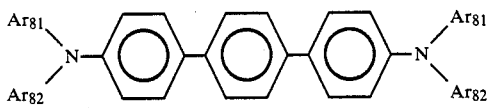

wherein $Ar_{81}$ and $Ar_{82}$ each represent a substituted or unsubstituted aryl group.

9. The electrophotographic photosensitive member for infrared rays according to claim 1, wherein said function-separated type electrophotographic photosensitive member has a laminated structure comprising a charge generation layer and a charge transport layer.

10. The electrophotographic photosensitive member for infrared rays according to claim 9, wherein said charge generation layer contains the disazo pigment represented by the above Formula (1), and said charge transport layer contains a compound selected from the compounds represented by the above Formulas (3), (5), (6), (7) and (8).

11. The electrophotograpic photosensitive member for infrared rays according to claim 9, wherein said charge generation layer contains the disazo pigment represented by the above Formula (2), and said charge transport layer contains the hydrazone compound represented by the above Formula (4).

12. The electrophotographic photosensitive member for infrared rays according to claim 9, wherein said charge generation layer has a thickness of 5 μm or less.

13. The electrophotographic photosensitive member for infrared rays according to claim 9, wherein said charge generation layer has a thickness of 0.01 to 1 μm.

14. The electrophotographic photosensitive member for infrared rays according to claim 9, wherein said charge transport layer has a thickness of 5 to 30 μm.

15. The electrophotographic photosensitive member for infrared rays according to claim 9, wherein said charge transport layer has a thickness of 8 to 20 μm.

16. The electrophotograpic photosensitive member for infrared rays according to claim 9, wherein said charge transport layer is laminated on the charge generation layer.

17. The electrophotographic photosensitive member for infrared rays according to claim 9, wherein said charge generation layer is laminated on the charge transport layer.

18. The electrophotographic photosensitive member according to claim 1 wherein $R_1$ is a disazo pigment represented by Formula (1) is a substituted or unsubstituted alkyl group.

* * * * *

UNITED STATES PATENT AND TRADEMARK OFFICE
CERTIFICATE OF CORRECTION

PATENT NO. : 4,830,944
DATED : May 16, 1989
INVENTOR(S) : SHOJI UMEHARA, ET AL.

It is certified that error appears in the above-identified patent and that said Letters Patent is hereby corrected as shown below:

COLUMN 1

Line 18, "September 1962)" should read --(September 1962)--.
    Line 20, "electrophotgraphic" should read --electrophotographic--.
    Line 44, "recent years," should read --in recent years,--.
    Line 51, "750 mm" should read --750 nm--.

COLUMN 4

Line 30, "substitutent" should read --substituent--.
    Line 49, "and iodine" should read --and an iodine--.

COLUMN 5

Line 26, "DAD" should read --ADA--.

COLUMN 29

Line 45, "a" should read --an--.

COLUMN 31

Line 8, "charge carries" should read --charge carriers--.
    Line 35, "a" should read --as--.
    Line 65, "compounds" should read --compound--.

UNITED STATES PATENT AND TRADEMARK OFFICE
CERTIFICATE OF CORRECTION

PATENT NO. : 4,830,944
DATED : May 16, 1989
INVENTOR(S) : SHOJI UMEHARA, ET AL.

It is certified that error appears in the above-identified patent and that said Letters Patent is hereby corrected as shown below:

COLUMN 32

Line 13, "quinoline carbozole," should read --quinoline carbazole,--.
Line 14, "phynoxazine." should read --phenoxazine.--.
Line 15, "gorup" should read --group--.
Line 17, "includes" should read --include--.
Line 22, "group" should read --group,--.
Line 39, "phenetyl group," should read --phenethyl group,--.

COLUMN 34

Line 26, "dix-" should read --dixyl- --.
line 27, delete --yl--

COLUMN 65

Form V-2,

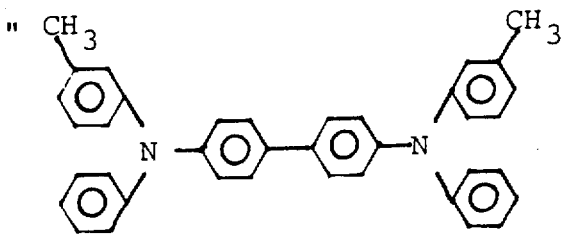

should read

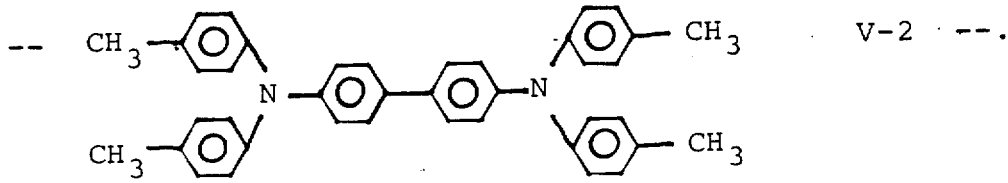

UNITED STATES PATENT AND TRADEMARK OFFICE
CERTIFICATE OF CORRECTION

PATENT NO. : 4,830,944

DATED : May 16, 1989

INVENTOR(S) : SHOJI UMEHARA, ET AL.  Page 3 of 5

It is certified that error appears in the above-identified patent and that said Letters Patent is hereby corrected as shown below:

COLUMN 68

Line 30, "vaccum" should read --vaccuum--.
    Line 55, "need" should read --needs--.
    Line 63, "exposed position" should read --exposed portion--.

COLUMN 69

Line 20, "need" should read --needs--.
    Line 39, "long term" should read --long-term--.

COLUMN 70

Line 23, "decaying" should read --reducing--.

COLUMN 74

Line 52, "decaying" should read --reducing--.

COLUMN 75

Line 3, "transfer potential: +700;" should read --transfer potential: +700V;--.
    Line 8, "50 lux.sec" should read --50 lux.sec.--.
    Line 34, "members" should read --manners--.
    Line 53, "an" should read --a--.

UNITED STATES PATENT AND TRADEMARK OFFICE
CERTIFICATE OF CORRECTION

PATENT NO. : 4,830,944
DATED : May 16, 1989
INVENTOR(S) : SHOJI UMEHARA, ET AL.      Page 4 of 5

It is certified that error appears in the above-identified patent and that said Letters Patent is hereby corrected as shown below:

COLUMN 76

Line 63, "electrophootgraphic" should read --electrophotographic--.
    Line 64, "infrared rays" should read --for infrared rays--.

COLUMN 77

Line 21, "hydrozone" should read --hydrazone--.

COLUMN 78

Line 58, "usbstituted" should read --substituted--.

COLUMN 79

Line 23, "electrophotograpic" should read --electrophotographic--.

UNITED STATES PATENT AND TRADEMARK OFFICE
CERTIFICATE OF CORRECTION

PATENT NO. : 4,830,944

DATED : May 16, 1989

INVENTOR(S) : SHOJI UMEHARA, ET AL.    Page 5 of 5

It is certified that error appears in the above-identified patent and that said Letters Patent is hereby corrected as shown below:

COLUMN 80

Line 15, "electrophotograpic" should read --electrophotographic--.

Line 24, "is" should read --in--.

Signed and Sealed this

Twenty-first Day of May, 1991

*Attest:*

HARRY F. MANBECK, JR.

*Attesting Officer*   *Commissioner of Patents and Trademarks*